(12) United States Patent
Mimura et al.

(10) Patent No.: US 9,088,724 B2
(45) Date of Patent: Jul. 21, 2015

(54) ZOOM LENS AND IMAGE PICKUP APPARATUS USING THE SAME

(71) Applicants: OLYMPUS CORPORATION, Tokyo (JP); OLYMPUS IMAGING CORP., Tokyo (JP)

(72) Inventors: Takayuki Mimura, Kanagawa (JP); Masahiro Imamura, Tokyo (JP); Takahiro Amanai, Tokyo (JP)

(73) Assignees: OLYMPUS CORPORATION, Tokyo (JP); OLYMPUS IMAGING CORP., Tokyo (JP)

( * ) Notice: Subject to any disclaimer, the term of this patent is extended or adjusted under 35 U.S.C. 154(b) by 78 days.

(21) Appl. No.: 14/013,850

(22) Filed: Aug. 29, 2013

(65) Prior Publication Data

US 2014/0125827 A1    May 8, 2014

(30) Foreign Application Priority Data

Nov. 7, 2012  (JP) ................................. 2012-245807

(51) Int. Cl.
*H04N 5/235* (2006.01)
*G02B 15/173* (2006.01)
*G02B 27/64* (2006.01)

(52) U.S. Cl.
CPC .............. *H04N 5/235* (2013.01); *G02B 15/173* (2013.01); *G02B 27/646* (2013.01)

(58) Field of Classification Search
CPC . H04N 5/23296; H04N 5/2254; H04N 5/235; G02B 15/173; G02B 27/646; G02B 9/60; G02B 15/14; G02B 15/177; G02B 15/20; G02B 13/009; G02B 5/04
See application file for complete search history.

(56) References Cited

U.S. PATENT DOCUMENTS

| | | | |
|---|---|---|---|
| 8,351,130 B2 | 1/2013 | Fujisaki | |
| 8,379,114 B2* | 2/2013 | Touchi et al. | 348/240.3 |
| 8,878,975 B2* | 11/2014 | Tang et al. | 348/335 |
| 2011/0026133 A1* | 2/2011 | Fujisaki | 359/683 |
| 2011/0085248 A1* | 4/2011 | Ohtake et al. | 359/683 |
| 2013/0010174 A1* | 1/2013 | Shinohara et al. | 348/335 |

FOREIGN PATENT DOCUMENTS

JP    2012-083472    4/2012

* cited by examiner

*Primary Examiner* — Luong T Nguyen
(74) *Attorney, Agent, or Firm* — Kenyon & Kenyon LLP

(57) ABSTRACT

During zooming from the wide angle end to the telephoto end, the distance between the first lens unit having a positive refractive power and the second lens unit having a negative refractive power, the distance between the second lens unit and the third lens unit having a positive refractive power, and the distance between the third lens unit and the fourth lens unit having a negative refractive power vary. In zooming from the wide angle end to the telephoto end, the first lens unit is located closer to the object side at the telephoto end than at the wide angle end. The first lens unit consists of two lenses including a negative lens and a positive lens. The first lens unit has at least one aspheric surface in the optical path. The zoom lens satisfies the following conditional expression (1):

$$0.5 < (L_{TL}/\beta_{rear})/F_{LG1} < 1.0 \qquad (1).$$

20 Claims, 20 Drawing Sheets

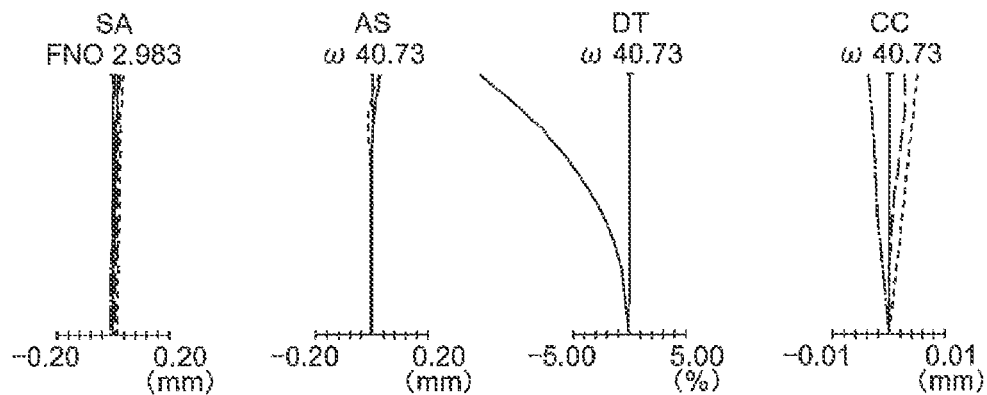
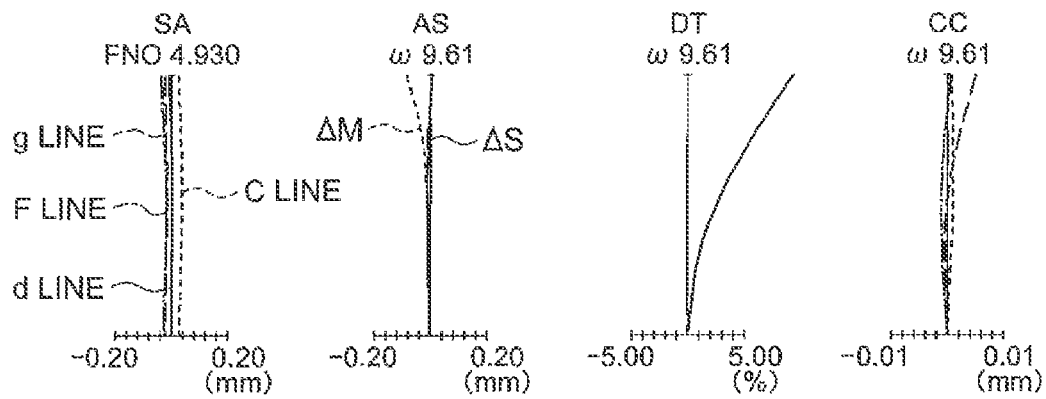
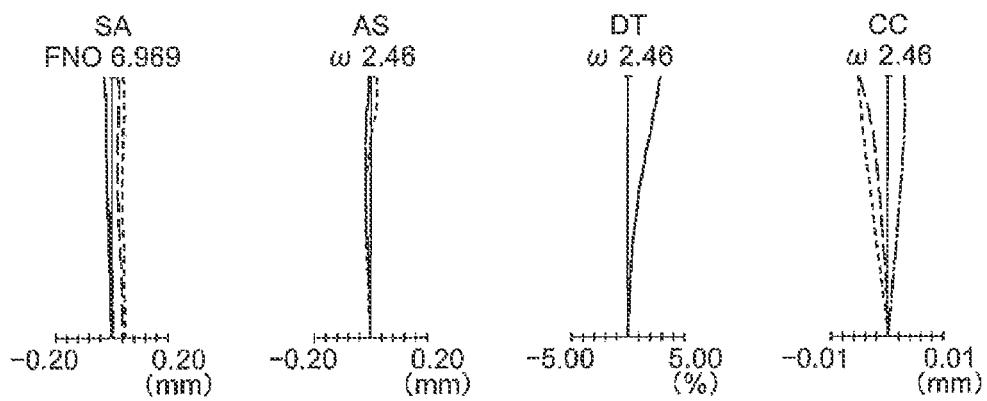

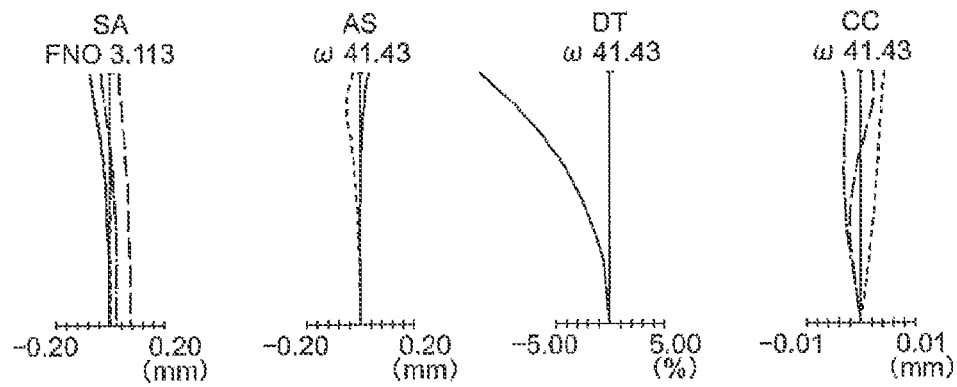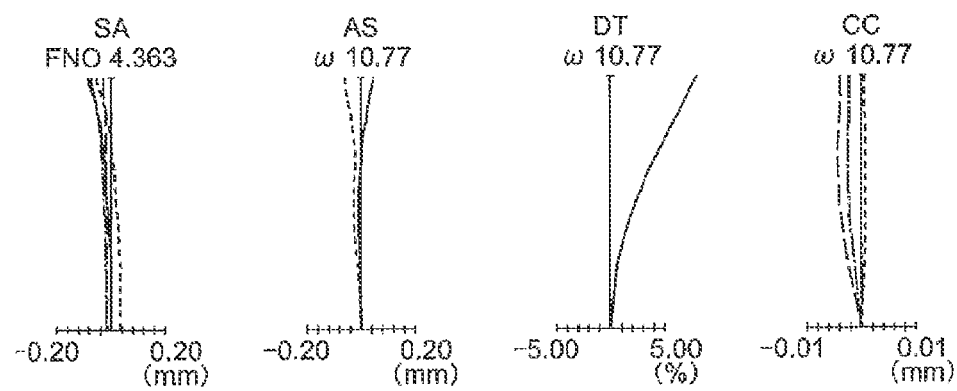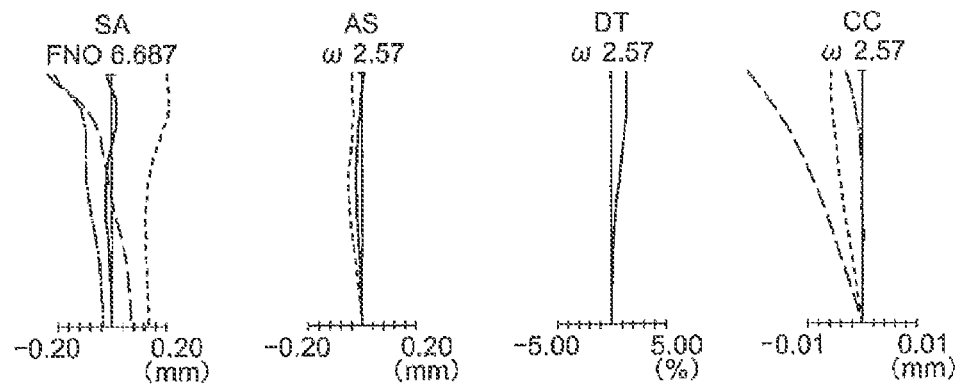

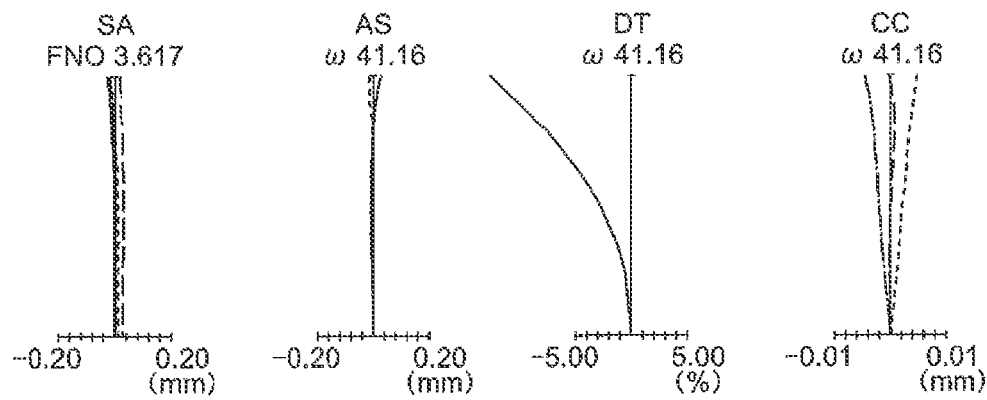
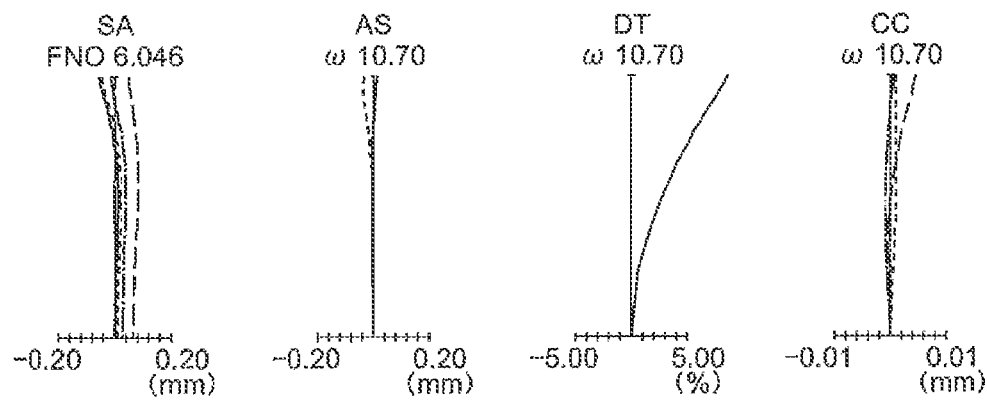
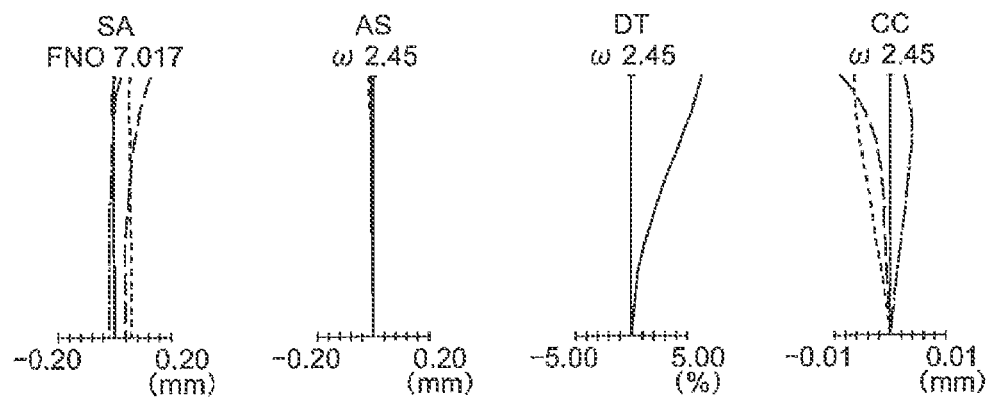

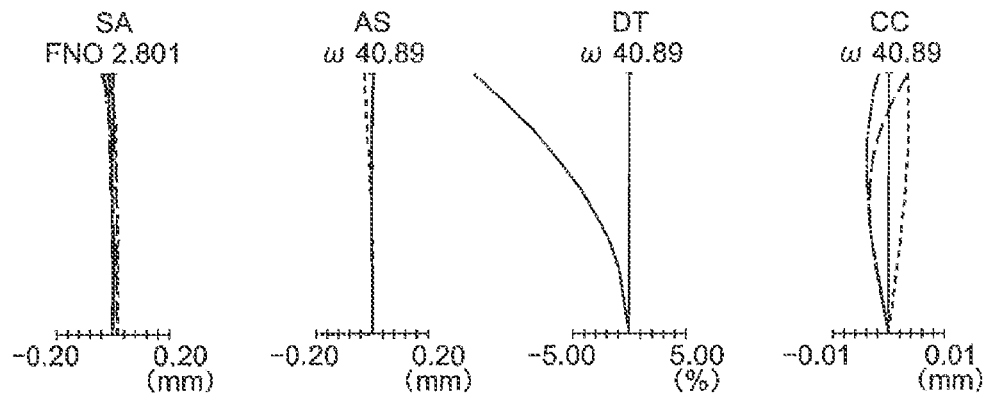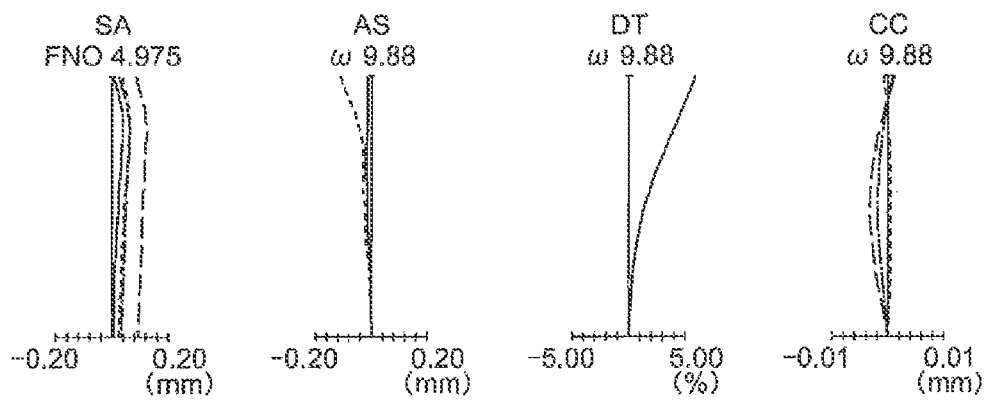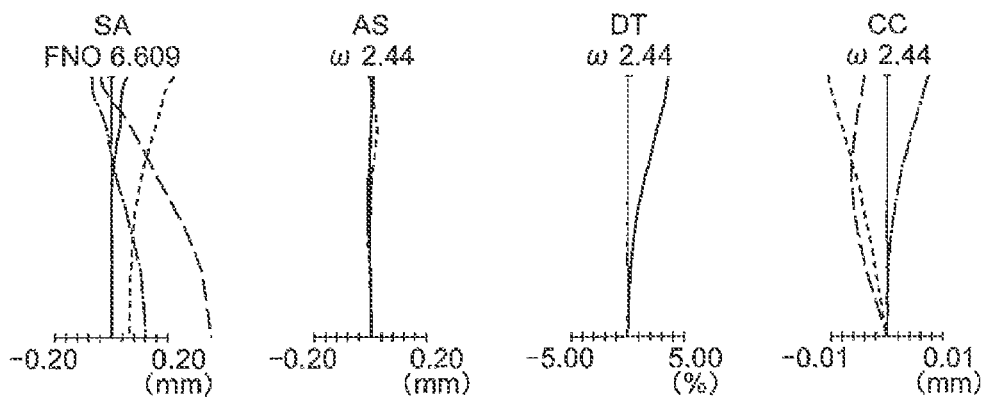

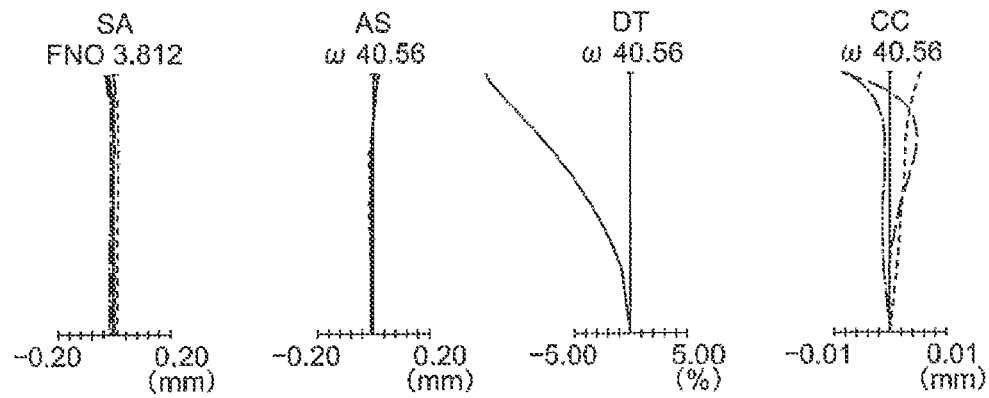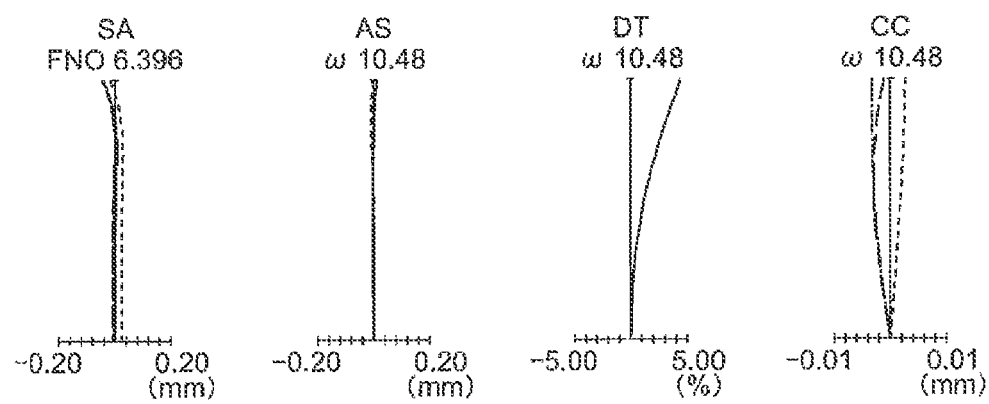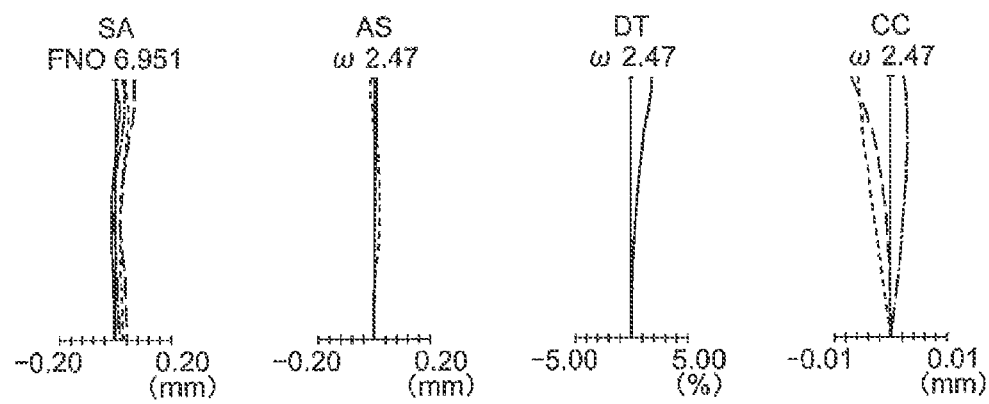

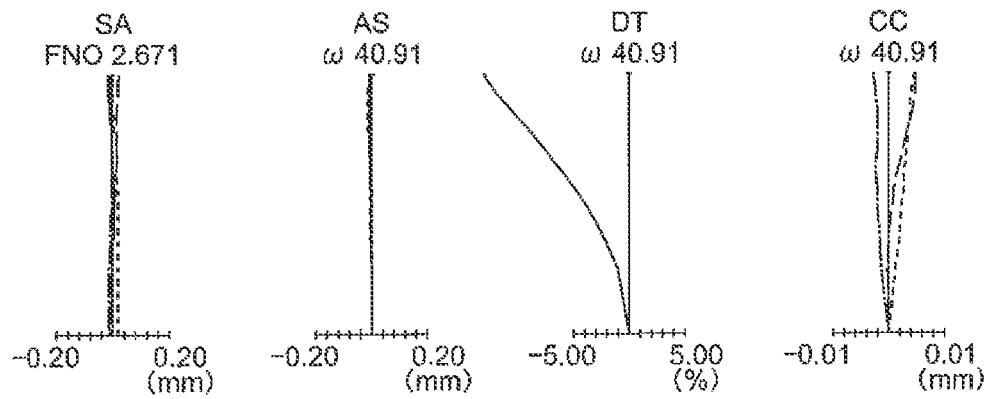
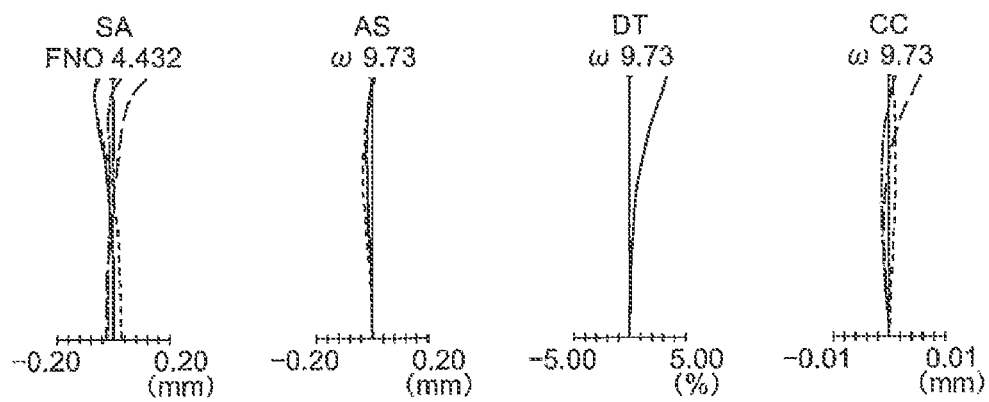
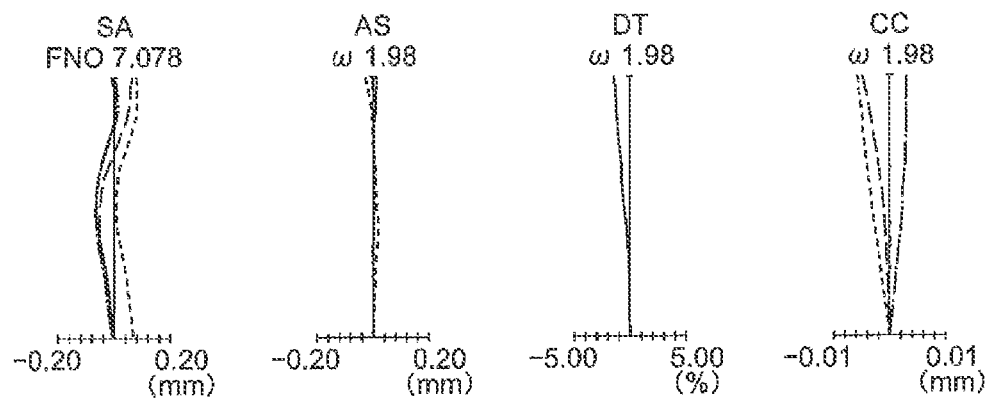

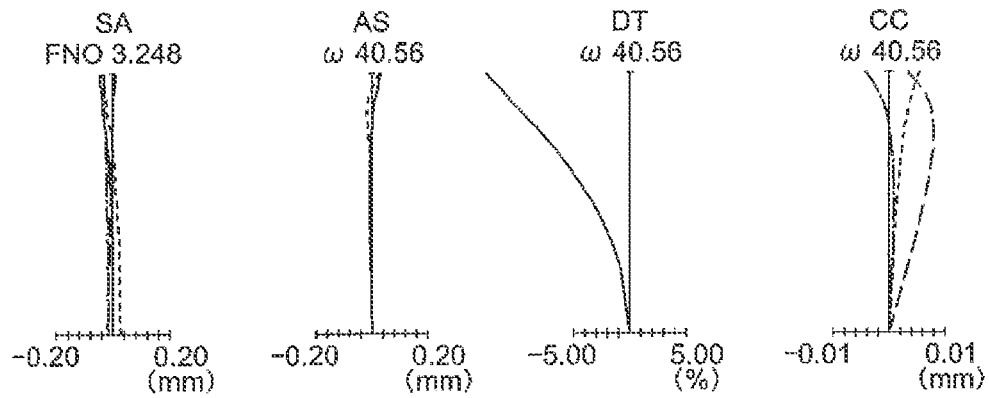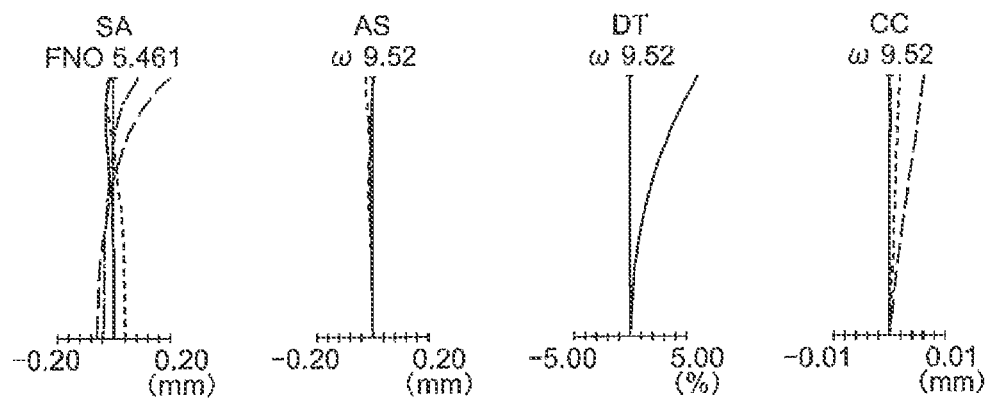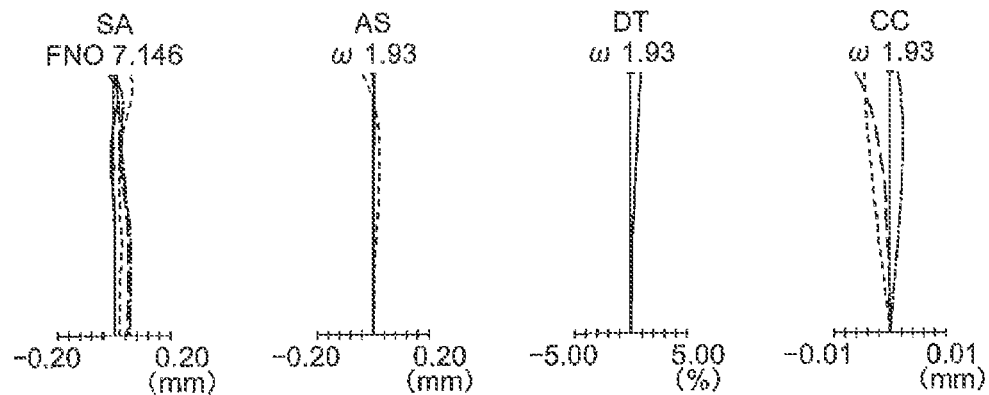

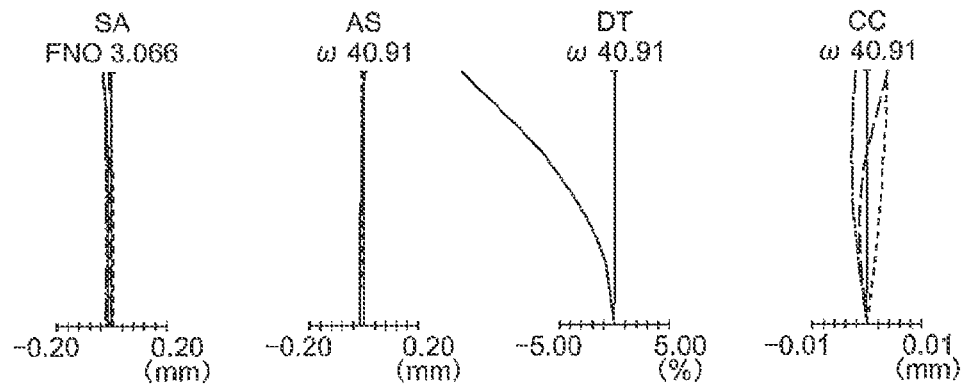
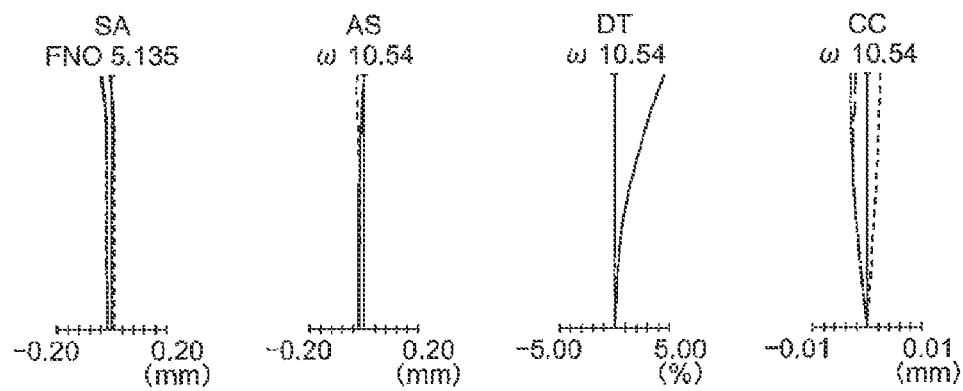
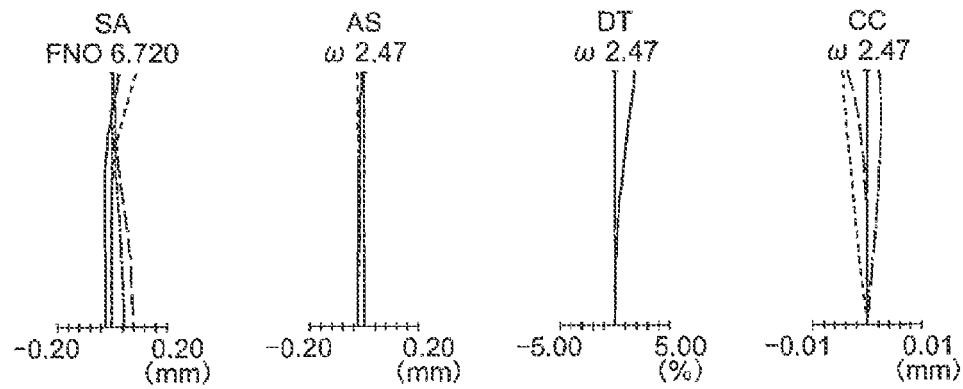

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2012-245807 filed on Nov. 7, 2012; the entire contents of which are incorporated herein by reference.

BACKGROUND OF THE INVENTION

1. Field of the Invention

The present invention relates a zoom lens and an image pickup apparatus using the same.

2. Description of the Related Art

As a zoom lens having a high zoom ratio, a zoom lens disclosed in Japanese Patent Application Laid-Open No. 2012-083472 has been known.

SUMMARY OF THE INVENTION

A zoom lens according to the present invention comprises, in order from the object side to the image side:

a first lens unit having a positive refractive power;
a second lens unit having a negative refractive power;
a third lens unit having a positive refractive power; and
a fourth lens unit having a negative refractive power, wherein during zooming from the wide angle end to the telephoto end, the distance between the first lens unit and the second lens unit, the distance between the second lens unit and the third lens unit, and the distance between the third lens unit and the fourth lens unit vary, in zooming from the wide angle end to the telephoto end, the first lens unit is located closer to the object side at the telephoto end than at the wide angle end, the first lens unit consists of two lenses including a negative lens and a positive lens, the first lens unit has at least one aspheric surface in the optical path, and the zoom lens satisfies the following conditional expression (1):

$$0.5 < (L_{TLt}/\beta_{rear})/F_{LG1} < 1.0 \quad (1),$$

where $L_{TLt}$ is the distance on the optical axis from the refracting surface closest to the object side in the entire zoom lens system to the image plane at the telephoto end, $\beta_{rear}$ is the absolute value of the lateral magnification of a composite optical system from the second lens unit to the image plane at the telephoto end, and $F_{LG1}$ is the focal length of the first lens unit.

A zoom lens according to another aspect of the present invention comprises, in order from the object side to the image side:

a first lens unit having a positive refractive power;
a second lens unit having a negative refractive power;
a third lens unit having a positive refractive power; and
a fourth lens unit having a negative refractive power, wherein during zooming from the wide angle end to the telephoto end, the distance between the first lens unit and the second lens unit, the distance between the second lens unit and the third lens unit, and the distance between the third lens unit and the fourth lens unit vary, in zooming from the wide angle end to the telephoto end, the first lens unit is located closer to the object side at the telephoto end than at the wide angle end, the first lens unit consists of two lenses including a negative lens and a positive lens, the first lens unit has at least one aspheric surface in the optical path, and the zoom lens satisfies the following conditional expression (2):

$$0.3 < F_{LG1}/F_{Lt} < 0.57 \quad (2),$$

where $F_{LG1}$ is the focal length of the first lens unit, and $F_{Lt}$ is the focal length of the entire zoom lens system at the telephoto end.

An image pickup apparatus according to the present invention comprises:

one of the above described zoom lenses; and
an image pickup element that converts an image formed by the zoom lens into an electrical signal.

BRIEF DESCRIPTION OF THE DRAWINGS

FIG. 1A shows the state at the wide angle end, FIG. 1B shows the state in an intermediate focal length state, and FIG. 1C shows the state at the telephoto end;

FIG. 2A shows the state at the wide angle end, FIG. 2B shows the state in an intermediate focal length state, and FIG. 2C shows the state at the telephoto end;

FIG. 3A shows the state at the wide angle end, FIG. 3B shows the state in an intermediate focal length state, and FIG. 3C shows the state at the telephoto end;

FIG. 4A shows the state at the wide angle end, FIG. 4B shows the state in an intermediate focal length state, and FIG. 4C shows the state at the telephoto end;

FIG. 5A shows the state at the wide angle end, FIG. 5B shows the state in an intermediate focal length state, and FIG. 5C shows the state at the telephoto end;

FIG. 6A shows the state at the wide angle end, FIG. 6B shows the state in an intermediate focal length state, and FIG. 6C shows the state at the telephoto end;

FIG. 7A shows the state at the wide angle end, FIG. 7B shows the state in an intermediate focal length state, and FIG. 7C shows the state at the telephoto end;

FIG. 8A shows the state at the wide angle end, FIG. 8B shows the state in an intermediate focal length state, and FIG. 8C shows the state at the telephoto end;

FIGS. 9A to 9L are aberration diagrams of the zoom lens according to the first embodiment in the state in which the zoom lens is focused on an object point at infinity;

FIGS. 10A to 10L are aberration diagrams of the zoom lens according to the second embodiment in the state in which the zoom lens is focused on an object point at infinity;

FIGS. 11A to 11L are aberration diagrams of the zoom lens according to the third embodiment in the state in which the zoom lens is focused on an object point at infinity;

FIGS. 12A to 12L are aberration diagrams of the zoom lens according to the fourth embodiment in the state in which the zoom lens is focused on an object point at infinity;

FIGS. 13A to 13L are aberration diagrams of the zoom lens according to the fifth embodiment in the state in which the zoom lens is focused on an object point at infinity;

FIGS. 14A to 14L are aberration diagrams of the zoom lens according to the sixth embodiment in the state in which the zoom lens is focused on an object point at infinity;

FIGS. 15A to 15L are aberration diagrams of the zoom lens according to the seventh embodiment in the state in which the zoom lens is focused on an object point at infinity;

FIGS. 16A to 16L are aberration diagrams of the zoom lens according to the eighth embodiment in the state in which the zoom lens is focused on an object point at infinity;

DETAILED DESCRIPTION OF THE INVENTION

Figure 1A:
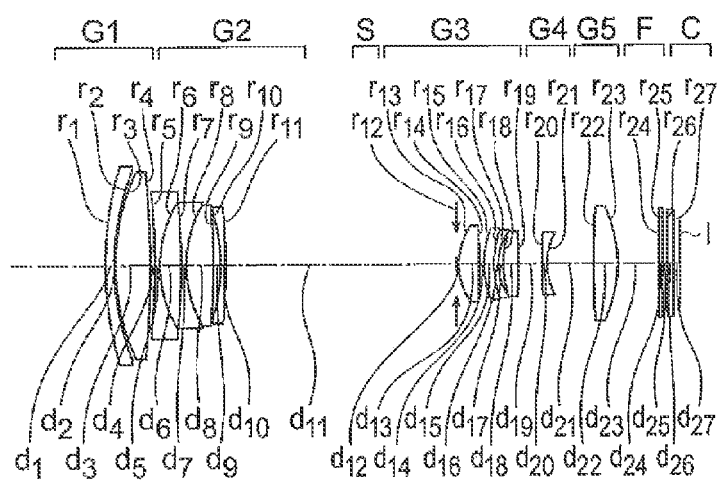
FIGS. 1A, 1B, and 1C are cross sectional views of a zoom lens according to a first example of the present invention taken along its optical axis, showing its configuration in the state in which the zoom lens is focused on an object point at infinity, where

In the following, embodiments of the zoom lens and the image pickup apparatus using the same according to the present invention will be described in detail with reference to the drawings. It should be understood, however, that the present invention is by no means limited by the embodiments.

Prior to the description of examples, the operation and advantages of the zoom lens according to some embodiments of the present invention will be described.

A zoom lens according to an embodiment of the present invention includes, in order from the object side to the image side:

a first lens unit having a positive refractive power;
a second lens unit having a negative refractive power;
a third lens unit having a positive refractive power; and
a fourth lens unit having a negative refractive power,
wherein
during zooming from the wide angle end to the telephoto end, the distance between the first lens unit and the second lens unit, the distance between the second lens unit and the third lens unit, and the distance between the third lens unit and the fourth lens unit vary, the first lens unit is located closer to the object side at the telephoto end than at the wide angle end, the first lens unit consists of two lenses including a negative lens and a positive lens, and the first lens unit has at least one aspheric surface in the optical path.

This is the basic construction of the zoom lens according to this embodiment.

This construction is advantageous for achieving an appropriately high zoom ratio. Moreover, this construction allows the first lens unit to be located closer to the image side at the wide angle end, helping reduction of the diameter of the zoom lens.

At the telephoto end, the first lens unit and the second lens unit constitute a telephoto type configuration having a positive-negative refractive power arrangement, and in addition the third lens unit and the fourth lens unit also constitute a telephoto type configuration having a positive-negative refractive power arrangement. This is advantageous for reduction of the overall length of the zoom lens at the telephoto end.

Furthermore, the first lens unit has an aspheric surface and consists of two lenses including a negative lens and a positive lens. This makes the construction of the first lens unit simple and helps reduction of chromatic aberration at the telephoto end and reduction of curvature of field at the wide angle end.

It is preferred that the zoom lens having the above-described basic construction satisfy one or more of the following features.

It is preferred that the following conditional expression (1) be satisfied:

$$0.5 < (L_{TLt}/\beta_{rear})/F_{LG1} < 1.0 \quad (1),$$

where $L_{TLt}$ is the distance on the optical axis from the refracting surface closest to the object side in the zoom lens to the image plane at the telephoto end, $\beta_{rear}$ is the absolute value of the lateral magnification of a composite optical system from the second lens unit to the image plane at the telephoto end, and $F_{LG1}$ is the focal length of the first lens unit.

It is preferred that the lateral magnification of the composite optical system made up of the second and subsequent lens units be so small that the value of the term $(L_{TLt}/\beta_{rear})/F_{LG1}$ in conditional expression (1) does not fall below the lower limit. This helps reduction of magnification of chromatic aberration that tends to be generated in the first lens unit.

It is preferred that the refractive power of the first lens unit is so low that the value of the term $(L_{TLt}/\beta_{rear})/F_{LG1}$ in conditional expression (1) does not exceed the upper limit. This helps reduction of curvature of field at the wide angle end or reduction of the overall length of the zoom lens at the telephoto end, facilitating reduction of variation in the weight balance of the zoom lens.

It is preferred that the first lens unit satisfies the following conditional expression (2):

$$0.3 < F_{LG1}/F_{Lt} < 0.57 \quad (2),$$

where $F_{LG1}$ is the focal length of the first lens unit, and $F_{Lt}$ is the focal length of the entire zoom lens system at the telephoto end.

It is preferred that the refractive power of the first lens unit be so low that the value of the term $F_{LG1}/F_{Lt}$ in conditional expression (2) does not fall below the lower limit. This helps reduction of axial and off-axis chromatic aberration at the telephoto end and also helps reduction of spherical aberration at the telephoto end.

If the refractive power of the first lens unit be so high that the value of the term $F_{LG1}/F_{Lt}$ in conditional expression (2) is not exceeded, the overall length of the zoom lens at the telephoto end can be made small, and variation in the weight balance with the zooming can readily be reduced.

It is preferred that the zoom lens further have a fifth lens unit having a positive refractive power arranged on the image side of the fourth lens unit, the distance between the fourth lens unit and the fifth lens unit vary during zooming from the wide angle end to the telephoto end, and the zoom lens be a five-unit zoom lens.

With this configuration, the zoom lens has a symmetrical refractive power arrangement in which refractive powers of the lens units are, in order from the object side, positive, negative, positive, negative, and positive. This is advantageous for reduction of aberration over the zoom range from the wide angle end to the telephoto end.

Moreover, even when the fourth lens unit is designed to have a high negative refractive power, the position of the exit pupil can be made distant from the image plane by the effect of the fifth lens unit. Still further, the fourth lens unit having a high negative refractive power favorably leads to reduction in the size of the first to third lens units.

It is preferred that the first lens unit satisfies the following conditional expression (3):

$$0.004 < F_{LG1}/(F_{Lt} \times |\nu_{G1p} - \nu_{G1n}|) < 0.020 \quad (3)$$

where $F_{LG1}$ is the focal length of the first lens unit, $F_{Lt}$ is the focal length of the entire zoom lens system at the telephoto end, $\nu_{G1p}$ is the Abbe constant of the positive lens in the first lens unit, and $\nu_{G1n}$ is the Abbe constant of the negative lens in the first lens unit, $\nu_{G1p}$ being expressed by $\nu_{G1p}=(n_{dp}-1)/(n_{Fp}-n_{Cp})$ where $n_{dp}$ is the refractive index of the positive lens in the first lens unit with respect to the d-line, $n_{Cp}$ is the refractive index of the positive lens in the first lens unit with respect to the C-line, and $n_{Fp}$ is the refractive index of the positive lens in the first lens unit with respect to the F-line, and $\nu_{G1n}$ being expressed by $\nu_{G1n}=(n_{dn}-1)/(n_{Fn}-n_{Cn})$ where $n_{dn}$ is the refractive index of the negative lens in the first lens unit with respect to the d-line, $n_{Cn}$ is the refractive index of the negative lens in the first lens unit with respect to the C-line, and $n_{Fn}$ is the refractive index of the negative lens in the first lens unit with respect to the F-line.

It is preferred that the value of the term $F_{LG1}$ ($F_{Lt} \times |\nu_{G1p} - \nu_{G1n}|$) in conditional expression (3) do not fall below the lower limit and do not exceed the upper limit. This is advantageous for correction of chromatic aberration of magnification in the first lens unit. Then, the first lens unit is allowed to be designed to have a high positive refractive power, facilitating reduction of the overall length of the zoom lens at the telephoto end.

If the value of the term $F_{LG1}/(F_{Lt} \times |\nu_{G1p} - \nu_{G1n}|)$ in conditional expression (3) does not fall below the lower limit, overcorrection of chromatic aberration can readily be prevented. If the value of the term $F_{LG1}/(F_{Lt} \times |\nu_{G1p} - \nu_{G1n}|)$ in conditional expression (3) does not exceed the upper limit, correction of chromatic aberration is facilitated.

It is preferred that the first lens unit satisfies the following conditional expression (4):

$$2 < F_{LG1}/(F_{Lt} \times |P_{G1p} - P_{G1n}|) < 10 \quad (4),$$

where $F_{LG1}$ is the focal length of the first lens unit, $F_{Lt}$ is the focal length of the entire zoom lens system at the telephoto end, $P_{G1p}$ is a value expressed by $P_{G1p}=(n_{gp}-n_{Fp})/(n_{Fp}-n_{Cp})$, where $n_{gp}$ is the refractive index of the positive lens in the first lens unit with respect to the g-line, $n_{Fp}$ is the refractive index of the positive lens in the first lens unit with respect to the F-line, and $n_{Cp}$ is the refractive index of the positive lens in the first lens unit with respect to the C-line, and $P_{G1n}$ is a value expressed by $P_{G1n}=(n_{gn}-n_{Fn})/(n_{Fn}-n_{Cn})$, where $n_{gn}$ is the refractive index of the negative lens in the first lens unit with respect to the g-line, $n_{Fn}$ is the refractive index of the negative lens in the first lens unit with respect to the F-line, and $n_{Cn}$ is the refractive index of the negative lens in the first lens unit with respect to the C-line.

It is preferred that the value of the term $F_{LG1}/(F_{Lt} \times |P_{G1p} - P_{G1n}|)$ in conditional expression (4) do not fall below the lower limit and do not exceed the upper limit. This is advantageous for correction of chromatic aberration of magnification attributed to secondary spectrum in the first lens unit. Moreover, the first lens unit can be designed to have a high positive refractive power, facilitating reduction of the overall length of the zoom lens at the telephoto end.

If the value of the term $F_{LG1}/(F_{Lt} \times |P_{G1p} - P_{G1n}|)$ in conditional expression (4) does not fall below the lower limit, secondary spectrum generated by the positive lens and secondary spectrum generated by the negative lens can cancel each other, helping reduction of chromatic aberration of magnification attributed to secondary spectrum at the telephoto end.

If the value of the term $F_{LG1}/(F_{Lt} \times |P_{G1p} - P_{G1n}|)$ in conditional expression (4) does not exceed the upper limit, selected materials of the positive lens and the negative lens will have a difference in the Abbe constant or the refractive index therebetween, which helps correction of other aberrations.

It is preferred that the first lens unit satisfies the following conditional expression (5):

$$0.05 < (L_{TLt} - L_{TLw})/F_{Lt} < 0.30 \quad (5),$$

where $L_{TLw}$ is the distance on the optical axis from the refracting surface closest to the object side in the zoom lens to the image plane at the wide angle end, $L_{TLt}$ is the distance on the optical axis from the refracting surface closest to the object side in the zoom lens to the image plane at the telephoto end, and $F_{Lt}$ is the focal length of the entire zoom lens system at the telephoto end.

If the overall length of the zoom lens at the wide angle end is so small that the value of the term $(L_{TLt} - L_{TLw})/F_{Lt}$ in conditional expression (5) does not fall below the lower limit, the effective diameter of the first lens unit can be designed to be small. This is advantageous for correction of curvature of field in the wide angle focal length range.

If the value of the term $(L_{TLt} - L_{TLw})/F_{Lt}$ in conditional expression (5) does not exceed the upper limit, the lateral magnification of a composite optical system constituted by the portion of the zoom lens on the image side of the first lens unit at the telephoto end can be made small. This is advantageous for reduction of chromatic aberration of magnification.

It is preferred that the first lens unit consists, in order from the object side to the image side, of a negative lens and a positive lens, and each of the negative lens and the positive lens in the first lens unit be a single lens.

Then, the first lens unit can include four refracting surfaces with a small number of lenses. This helps correction of aberrations.

Furthermore, it is preferred that the distance between the negative lens and the positive lens increase with increasing distance from the optical axis.

This helps reduction of chromatic aberration of magnification at the telephoto end. Moreover, the first lens unit can be designed to have a high positive refractive power, facilitating reduction of the overall length of the zoom lens.

It is preferred that the positive lens in the first lens unit have an aspheric surface, and both the object side surface and the image side surface thereof be aspheric surfaces.

The aspheric surface on the image side is advantageous for correction of curvature of field at the wide angle end. The aspheric surface on the object side facilitates correction of spherical aberration over the entire wavelength range used for imaging at the telephoto end.

It is preferred that the fourth lens unit be located closer to the object side at the telephoto end than at the wide angle end.

This is advantageous for reduction of variation in the curvature of field with zooming.

It is preferred that the zoom lens further have a fifth lens unit having a positive refractive power arranged on the image side of the fourth lens unit, during zooming from the wide angle end to the telephoto end the fifth lens unit first move toward the image side, and the fifth lens unit be located closer to the image side at the telephoto end than at the wide angle end.

Thus, the fifth lens unit can be designed to have a magnifying effect. This is advantageous in achieving an adequate zoom ratio of the zoom lens. In particular, if the fifth lens unit has a magnifying effect in the wide angle focal length range, the lens units moving on the object side of the fifth lens unit need not be designed to move fast, leading to reduction in the power load on the driving system. Furthermore, variation of spherical aberration with zooming in the wide angle focal length range can readily be reduced.

Furthermore, it is preferred that during zooming from the wide angle end to the telephoto end, the fifth lens unit move only toward the image side.

With this feature, the contribution of the lens units located on the object side of the fifth lens unit to the magnification variation can be made smaller, facilitating reduction of variation in curvature of field and variation in spherical aberration with zooming from the wide angle end to the telephoto end.

Furthermore, it is preferred that during zooming from the wide angle end to the telephoto end, the first lens unit move only toward the object side.

This is advantageous for reduction in the size of the zoom lens at the wide angle end and for achieving an adequate zoom ratio.

It is preferred that for focusing from a long distance to a short distance, the fourth lens unit move toward the image side.

This helps reduction of variation in the image size on the image pickup surface (or the angle of view) and variation in aberration during the focusing operation.

It is preferred that the fourth lens unit be a single lens.

This leads to a reduction in the weight of the focusing lens unit, which is advantageous for reduction of electric power needed for focusing.

The fourth lens unit may be adapted to be shifted in directions perpendicular to the optical axis to stabilize image vibration caused by vibration of the zoom lens.

It is preferred that the second lens unit be located closer to the image side at the telephoto end than at the wide angle end, the third lens unit be located closer to the object side at the telephoto end than at the wide angle end, the fourth lens unit be located closer to the object side at the telephoto end than at the wide angle end so that the distance between the fourth lens unit and the third lens unit and the distance between the fourth lens unit and the fifth lens unit are larger at the telephoto end than at the wide angle end, and the fifth lens unit be located closer to the image side at the telephoto end than at the wide angle end.

With the above feature, aberration can readily be reduced while achieving an adequate zoom ratio of the zoom lens. In addition, it is easy to reduce variation in the weight balance of the zoom lens as a whole.

It is preferred that the following conditional expression (6) be satisfied:

$$17<F_{Lt}/F_{Lw}<50 \tag{6},$$

where $F_{Lt}$ is the focal length of the entire zoom lens system at the telephoto end, and $F_{Lw}$ is the focal length of the entire zoom lens system at the wide angle end.

If the value of the term $F_{Lt}/F_{Lw}$ in conditional expression (6) does not fall below the lower limit, the variation in the angle of view of in imaging can be made large, allowing angles of view suitable for various shooting situations to be selected. This is particularly advantageous in situations of shooting in the extremely long focal length range.

If the value of the term $F_{Lt}/F_{Lw}$ in conditional expression (6) does not exceed the upper limit, the zoom lens can be designed to have an appropriate speed at the telephoto end, even if the overall length of the zoom lens is made small.

An image pickup apparatus according to an embodiment includes the zoom lens according to the above-described embodiment and an image pickup element that converts an image formed by the zoom lens into an electrical signal.

With this construction, the overall length at the telephoto end of the focal length range can be made small, and variation in the weight balance with zooming can readily be made small. Furthermore, this construction is advantageous for improvement in the stability of the image pickup apparatus when it is mounted on a tripod regardless of the zoom state.

It is preferred that the image pickup apparatus according to the embodiment have a signal conversion unit to which the electrical signal is input to convert it into a signal representing an image in which distortion of the image formed on the image pickup element is corrected.

Thus, the image formed by the zoom lens in the wide angle focal length range may have distortion. This favors correction of curvature of field in the wide angle focal length range. Moreover, correction of distortion by signal processing further favors both size reduction and improvement in the performance.

In cases where the zoom lens has a focusing function, the above-described features and conditions should be interpreted as those in the state in which the zoom lens is focused on an object on the optical axis at the farthest distance.

It is preferred that two or more of the above-described features and conditions be adopted in combination.

It is preferred that the upper and/or lower limit values in the conditional expressions presented in the foregoing be further limited as follows in order that the advantages can be enjoyed more surely.

In conditional expression (1), it is more preferred that the lower limit value be 0.55, still more preferably 0.60, and the upper limit value be 0.85, still more preferably 0.80.

In conditional expression (2), it is more preferred that the lower limit value be 0.32, still more preferably 0.35, and the upper limit value be 0.50, still more preferably 0.40.

In conditional expression (3), it is more preferred that the lower limit value be 0.0045, still more preferably 0.0048, and the upper limit value be 0.015, still more preferably 0.012.

In conditional expression (4), it is more preferred that the lower limit value be 2.5, still more preferably 3.0, and the upper limit value be 8.8, still more preferably 7.0.

In conditional expression (5), it is more preferred that the lower limit value be 0.055, still more preferably 0.06, and the upper limit value be 0.25, still more preferably 0.20.

In conditional expression (6), it is more preferred that the lower limit value be 18, still more preferably 19, and the upper limit value be 30, still more preferably 25.

Figure 1B:
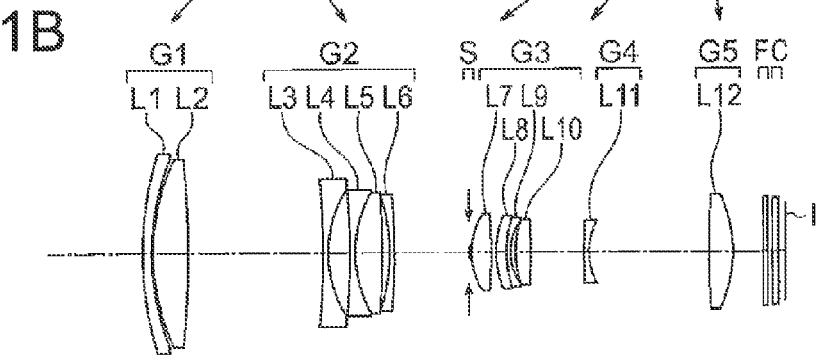
Figure 1C:
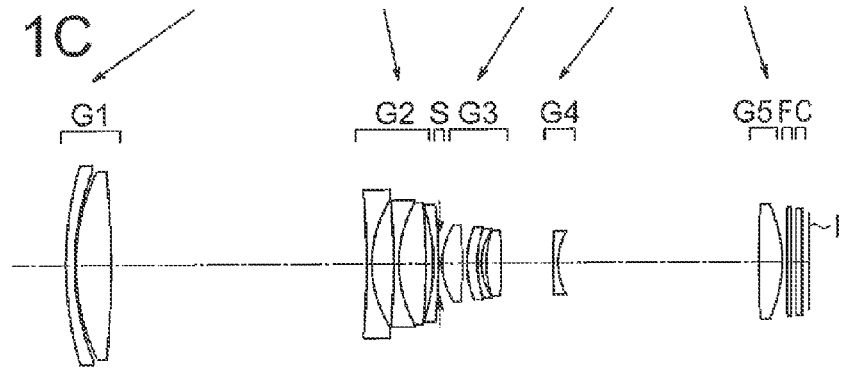
Figure 2A:
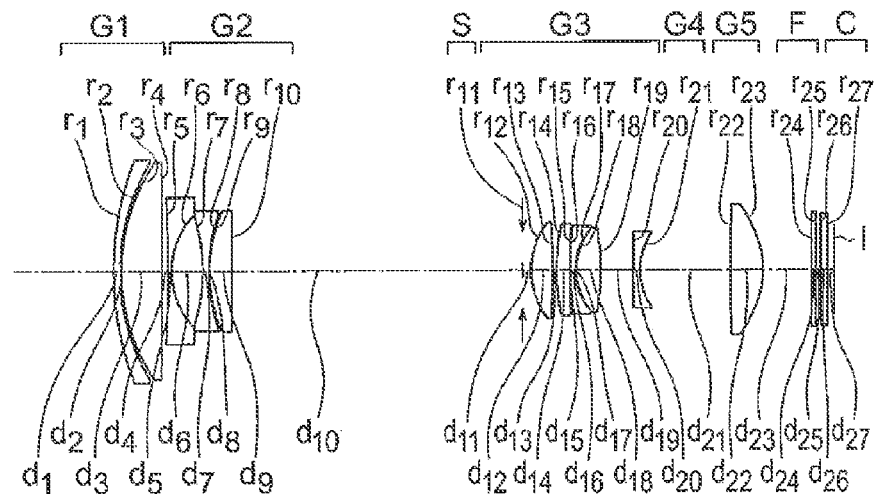
FIGS. 2A, 2B, and 2C are cross sectional views of a zoom lens according to a second example of the present invention taken along its optical axis, showing its configuration in the state in which the zoom lens is focused on an object point at infinity, where
Figure 2B:
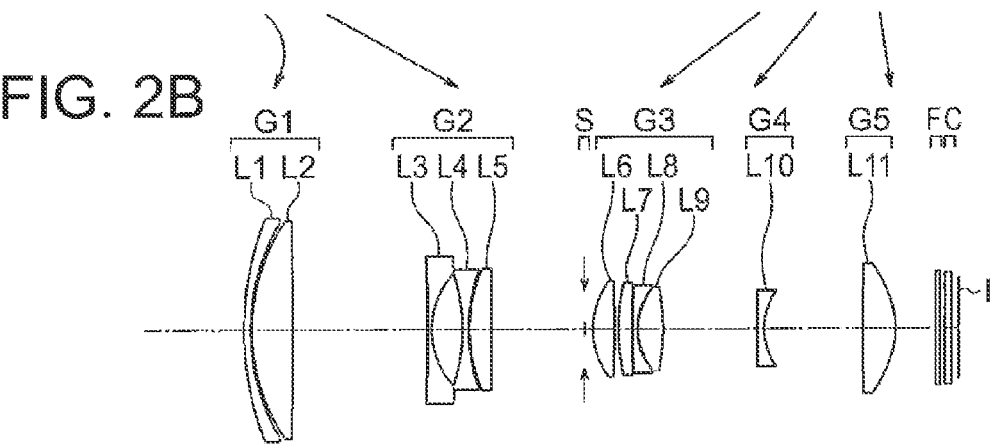
Figure 2C:
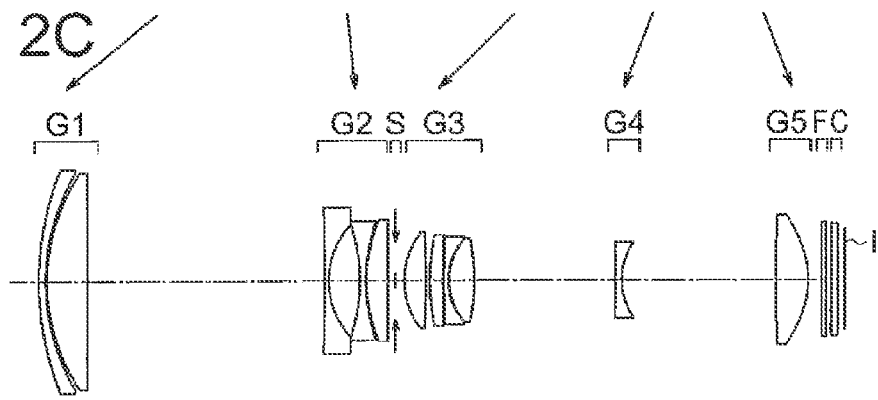

In the following, first to eighth examples of the zoom lens according to the present invention will be described. FIGS. 1A, 1B, and 1C are cross sectional views of a zoom lens according to the first example of the present invention taken along its optical axis, showing its configuration in the state in which the zoom lens is focused on an object point at infinity, where FIG. 1A shows the state at the wide angle end, FIG. 1B shows the state in an intermediate focal length state, and FIG. 1C shows the state at the telephoto end. FIGS. 2A, 2B, and 2C are cross sectional views of a zoom lens according to the second example of the present invention taken along its optical axis, showing its configuration in the state in which the zoom lens is focused on an object point at infinity, where FIG. 2A shows the state at the wide angle end, FIG. 2B shows the state in an intermediate focal length state, and FIG. 2C shows the state at the telephoto end.

Figure 3A:
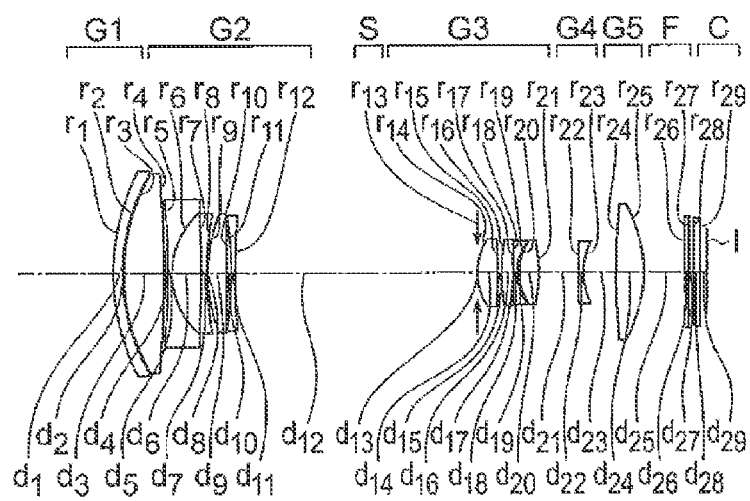
FIGS. 3A, 3B, and 3C are cross sectional views of a zoom lens according to a third example of the present invention taken along its optical axis, showing its configuration in the state in which the zoom lens is focused on an object point at infinity, where
Figure 3B:
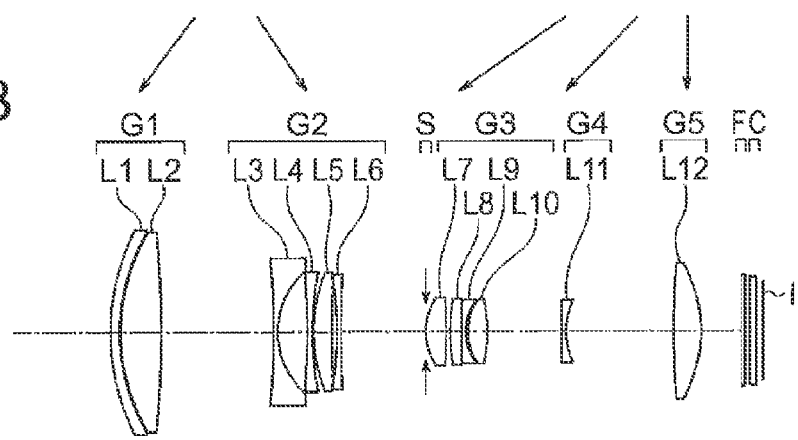
Figure 3C:
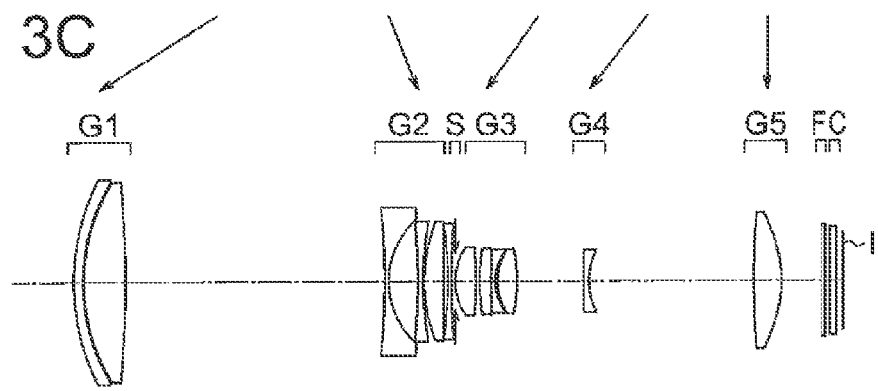
Figure 4A:
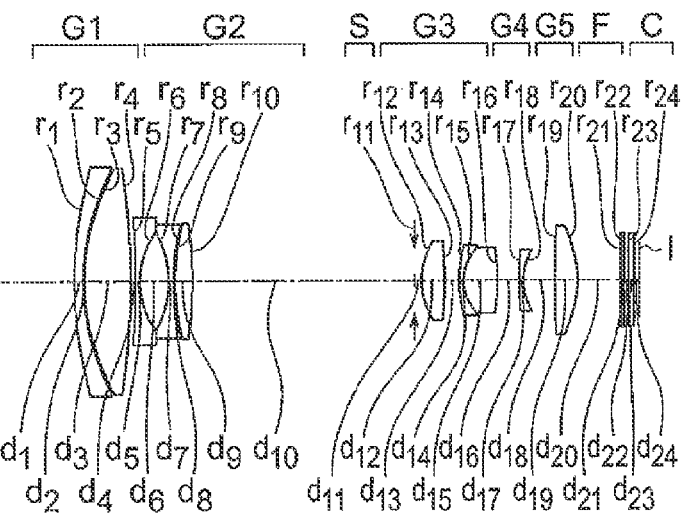
FIGS. 4A, 4B, and 4C are cross sectional views of a zoom lens according to a fourth example of the present invention taken along its optical axis, showing its configuration in the state in which the zoom lens is focused on an object point at infinity, where
Figure 4B:
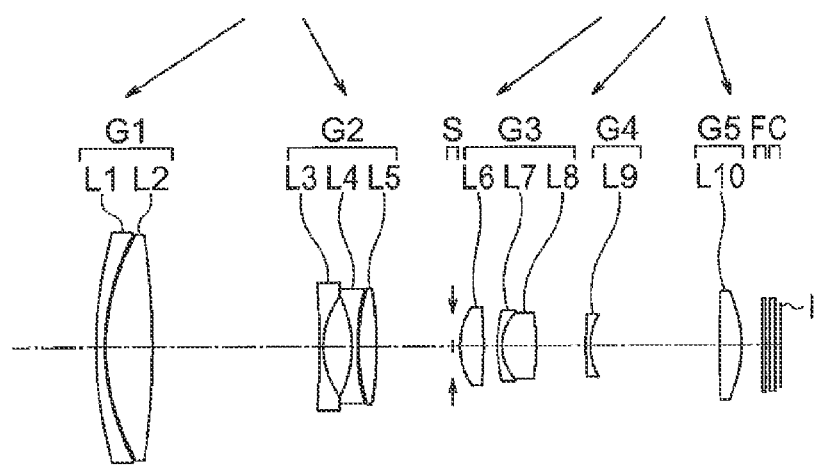
Figure 4C:
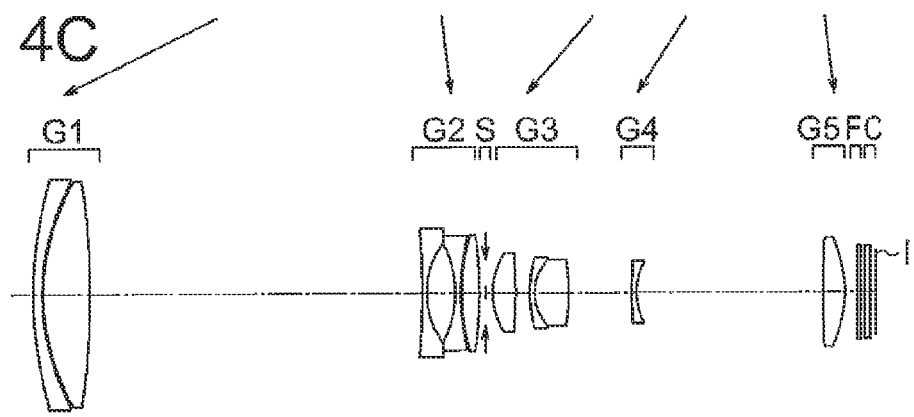
Figure 5A:
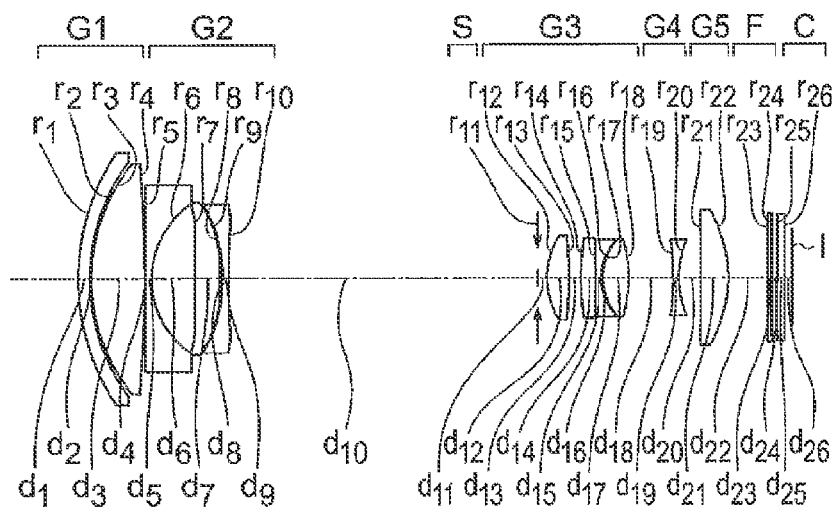
FIGS. 5A, 5B, and 5C are cross sectional views of a zoom lens according to a fifth example of the present invention taken along its optical axis, showing its configuration in the state in which the zoom lens is focused on an object point at infinity, where
Figure 5B:
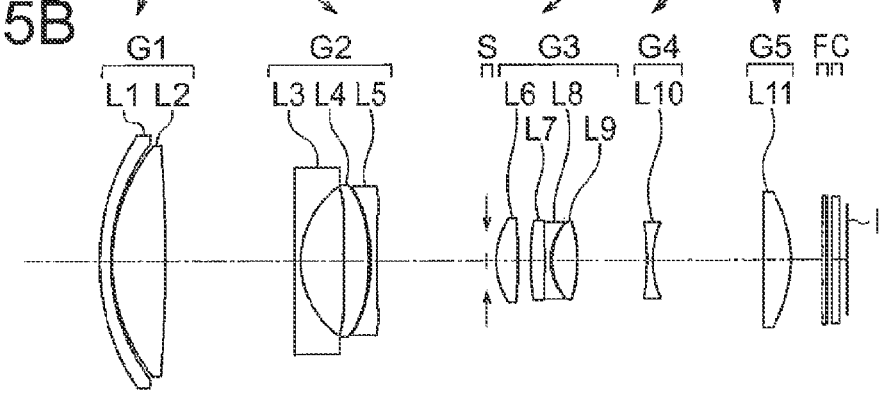
Figure 5C:
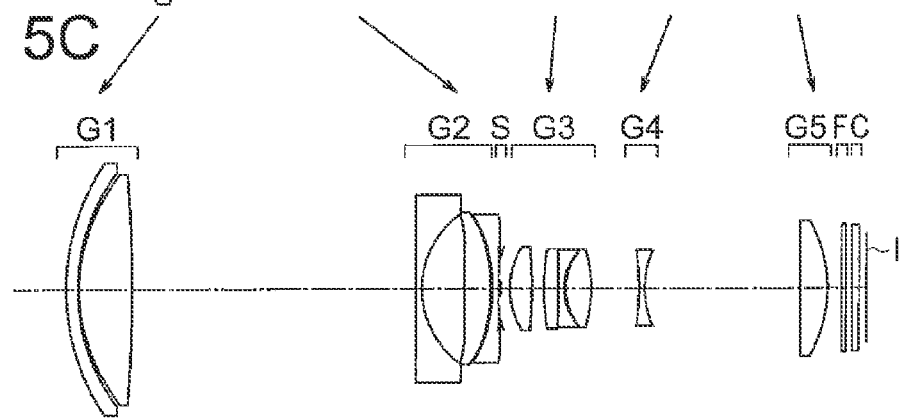
Figure 6A:
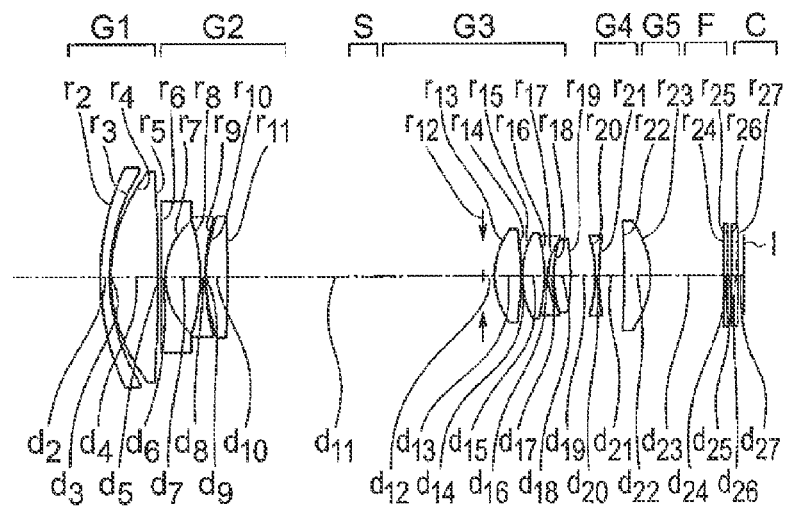
FIGS. 6A, 6B, and 6C are cross sectional views of a zoom lens according to a sixth example of the present invention taken along its optical axis, showing its configuration in the state in which the zoom lens is focused on an object point at infinity, where
Figure 6B:
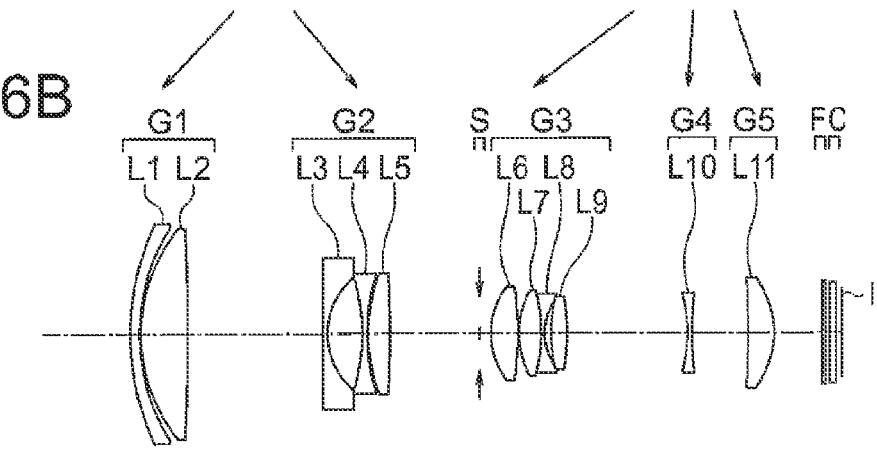
Figure 6C:
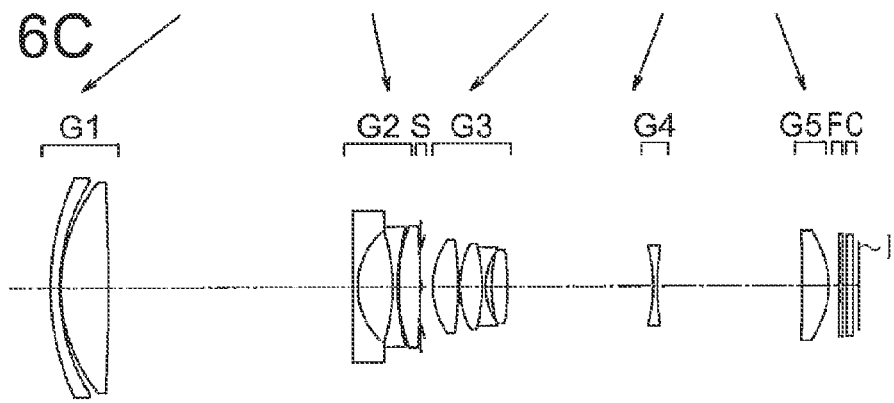

FIGS. 3A, 3B, and 3C are cross sectional views of a zoom lens according to the third example of the present invention taken along its optical axis, showing its configuration in the state in which the zoom lens is focused on an object point at infinity, where FIG. 3A shows the state at the wide angle end, FIG. 3B shows the state in an intermediate focal length state, and FIG. 3C shows the state at the telephoto end. FIGS. 4A, 4B, and 4C are cross sectional views of a zoom lens according to the fourth example of the present invention taken along its optical axis, showing its configuration in the state in which the zoom lens is focused on an object point at infinity, where FIG. 4A shows the state at the wide angle end, FIG. 4B shows the state in an intermediate focal length state, and FIG. 4C shows the state at the telephoto end. FIGS. 5A, 5B, and 5C are cross sectional views of a zoom lens according to the fifth example of the present invention taken along its optical axis, showing its configuration in the state in which the zoom lens is focused on an object point at infinity, where FIG. 5A shows the state at the wide angle end, FIG. 5B shows the state in an intermediate focal length state, and FIG. 5C shows the state at the telephoto end. FIGS. 6A, 6B, and 6C are cross sectional views of a zoom lens according to the sixth example of the present invention taken along its optical axis, showing its configuration in the state in which the zoom lens is focused on an object point at infinity, where FIG. 6A shows the state at the wide angle end, FIG. 6B shows the state in an intermediate focal length state, and FIG. 6C shows the state at the telephoto end.

Figure 7A:
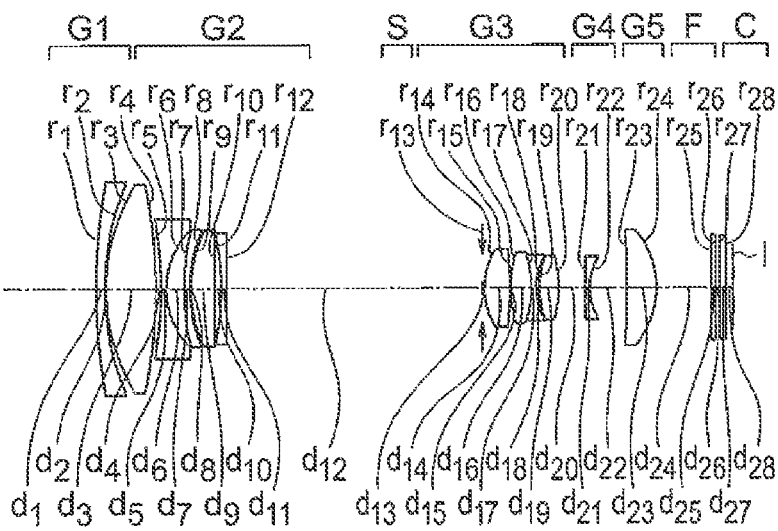
FIGS. 7A, 7B, and 7C are cross sectional views of a zoom lens according to a seventh example of the present invention taken along its optical axis, showing its configuration in the state in which the zoom lens is focused on an object point at infinity, where
Figure 7B:
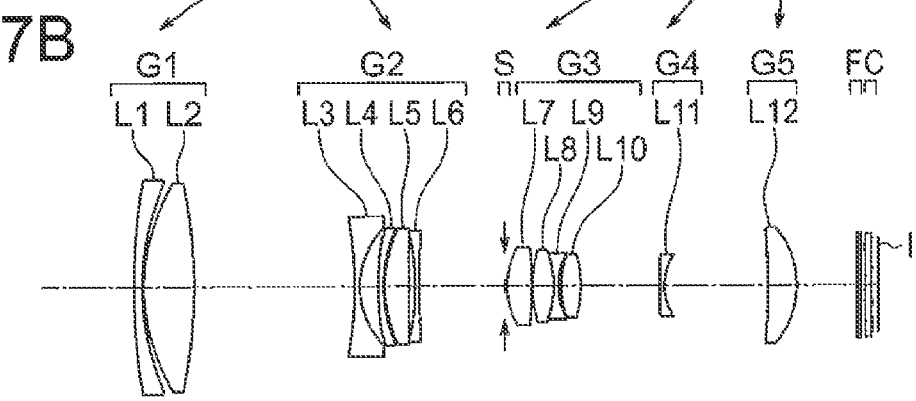
Figure 7C:
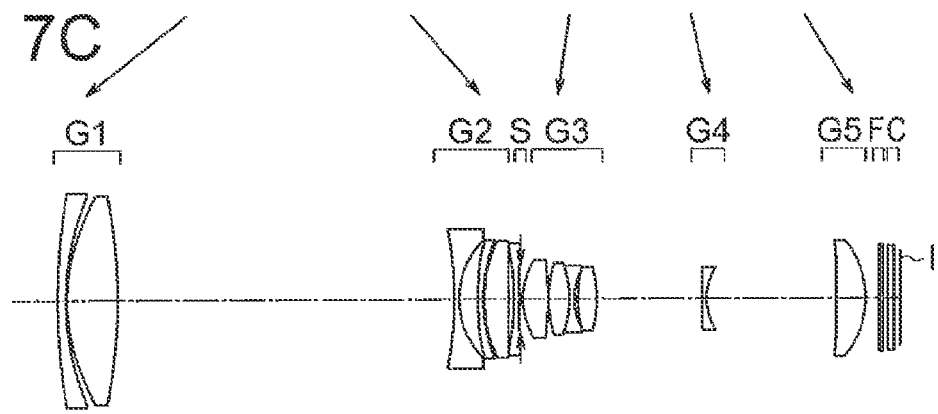
Figure 8A:
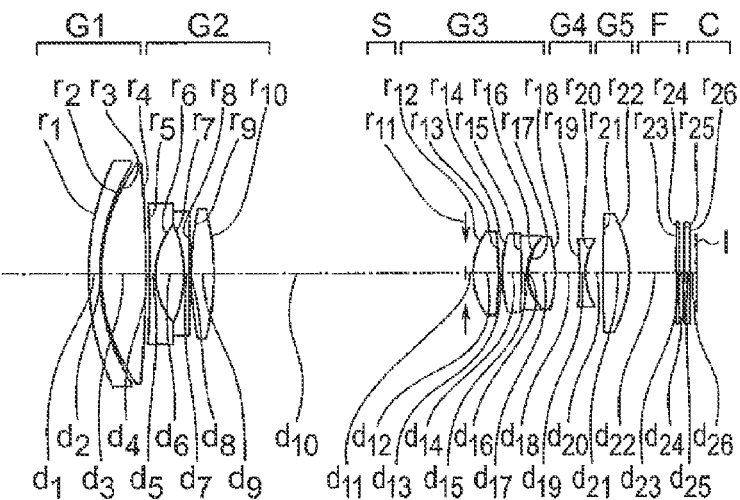
FIGS. 8A, 8B, and 8C are cross sectional views of a zoom lens according to an eighth example of the present invention taken along its optical axis, showing its configuration in the state in which the zoom lens is focused on an object point at infinity, where
Figure 8B:
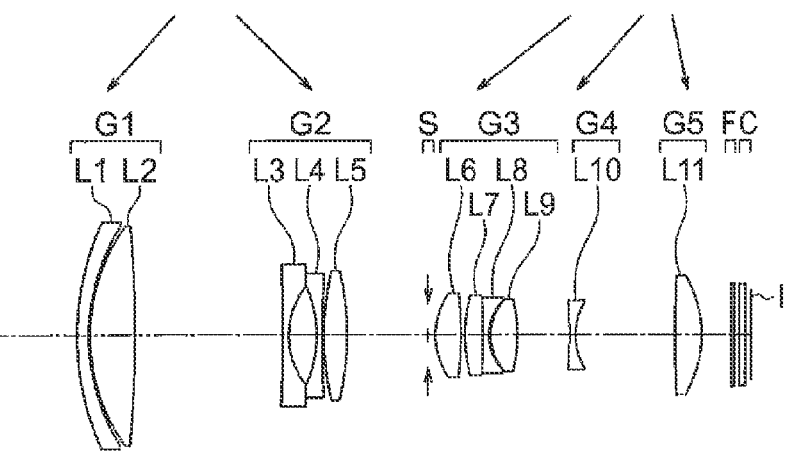
Figure 8C:
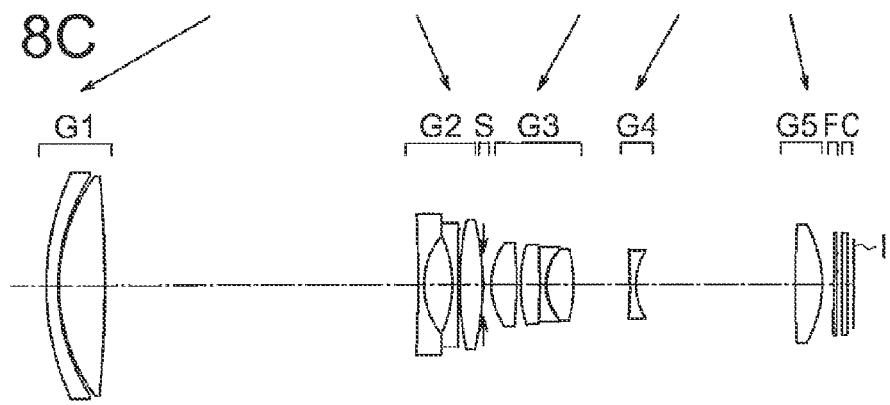

FIGS. 7A, 7B, and 7C are cross sectional views of a zoom lens according to the seventh example of the present invention taken along its optical axis, showing its configuration in the state in which the zoom lens is focused on an object point at infinity, where FIG. 7A shows the state at the wide angle end, FIG. 7B shows the state in an intermediate focal length state, and FIG. 7C shows the state at the telephoto end. FIGS. 8A, 8B, and 8C are cross sectional views of a zoom lens according to the eighth example of the present invention taken along its optical axis, showing its configuration in the state in which the zoom lens is focused on an object point at infinity, where FIG. 8A shows the state at the wide angle end, FIG. 8B shows the state in an intermediate focal length state, and FIG. 8C shows the state at the telephoto end. In FIGS. 1A to 8C, a first lens unit is denoted by G1, a second lens unit is denoted by G2, a third lens unit is denoted by G3, a fourth lens unit is denoted by G4, a fifth lens unit is denoted by G5, an aperture stop is denoted by S, a plane parallel plate constituting a low pass filter on which wavelength restriction coating for blocking or reducing infrared light is applied is denoted by F, a plane parallel plate constituting a cover glass for an electronic image pickup element is denoted by C, and the image plane is denoted by I. A multi-layer coating for wavelength restriction may be applied to the surface of the cover glass C. The cover glass C may be adapted to have a low pass filtering effect. The low pass filtering effect of the plane parallel plate F may be eliminated.

In each example, the aperture stop S moves integrally with the third lens unit G3. All the numerical data of the embodiments are for the state in which the zoom lens is focused on an object at infinity. In the numerical data, dimensions are in millimeters and angles are in degrees. In all the embodiments, focusing is performed by moving the fourth lens unit G4. Zoom data will be given for the wide angle end (WE), for the intermediate focal length state (ST), and for the telephoto end (TE).

Focusing from infinity to a very short distance is performed by moving the fourth lens unit toward the image side. Image stabilizing operation is performed by shifting the fourth lens unit in directions perpendicular to the optical axis.

In the wide angle focal length range, image processing for correcting negative distortion is performed. This is the reason why the image height is lower at the wide angle end.

As shown in FIGS. 1A, 1B, and 1C, the zoom lens according to the first example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 moves toward the image side, the third lens unit G3 moves toward the object side, the fourth lens unit G4 moves toward the object side, the fifth lens unit G5 moves toward the image side, and the aperture stop S moves toward the object side.

The first lens unit G1 is composed of a negative meniscus lens L1 having a convex surface directed toward the object side and a biconvex positive lens L2. The second lens unit G2 is composed of a biconcave negative lens L3, a biconcave negative lens L4, a biconvex positive lens L5, and a negative meniscus lens L6 having a convex surface directed toward the image side. The biconcave negative lens L4 and the biconvex positive lens L5 are cemented together. The third lens unit G3 is composed of a biconvex positive lens L7, a positive meniscus lens L8 having a convex surface directed toward the object side, a negative meniscus lens L9 having a convex surface directed toward the object side, and a biconvex positive lens L10. The positive meniscus lens L8 and the negative meniscus lens L9 are cemented together. The fourth lens unit G4 is composed of a negative meniscus lens L11 having a convex surface directed toward the object side. The fifth lens unit G5 is composed of a biconvex positive lens L12. The lens elements in each lens unit are arranged in the mentioned order from the object side.

There are six aspheric surfaces, which include both surfaces of the biconvex positive lens L2, the object side surface of the biconcave negative lens L4, both surfaces of the biconvex positive lens L7, and the image side surface of the biconvex positive lens L12.

As shown in FIGS. 2A, 2B, and 2C, the zoom lens according to the second example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 first moves toward the image side and thereafter moves toward the object side, the second lens unit G2 moves toward the image side, the third lens unit G3 moves toward the object side, the fourth lens unit G4 moves toward the object side, the fifth lens unit G5 moves toward the image side, and the aperture stop S moves toward the object side.

The first lens unit G1 is composed of a negative meniscus lens L1 having a convex surface directed toward the object side and a biconvex positive lens L2. The second lens unit G2 is composed of a biconcave negative lens L3, a biconcave negative lens L4, and a biconvex positive lens L5. The third lens unit G3 is composed of a biconvex positive lens L6, a positive meniscus lens L7 having a convex surface directed toward the object side, a negative meniscus lens L8 having a convex surface directed toward the object side, and a biconvex positive lens L9. The fourth lens unit G4 is composed of a negative meniscus lens L10 having a convex surface directed toward the object side. The fifth lens unit G5 is composed of a biconvex positive lens L11. The lens elements in each lens unit are arranged in the mentioned order from the object side.

There are eight aspheric surfaces, which include both surfaces of the biconvex positive lens L2, the object side surface of the biconcave negative lens L4, the image side surface of the biconvex positive lens L5, both surfaces of the biconvex positive lens L6, the image side surface of the biconvex positive lens L9, and the image side surface of the biconvex positive lens L11.

As shown in FIGS. 3A, 3B, and 3C, the zoom lens according to the third example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 moves toward the image side, the third lens unit G3 moves toward the object side, the fourth lens unit G4 moves toward the object side, the fifth lens unit G5 moves toward the image side, and the aperture stop S moves toward the object side.

The first lens unit G1 is composed of a negative meniscus lens L1 having a convex surface directed toward the object side and a biconvex positive lens L2. The second lens unit G2 is composed of a biconcave negative lens L3, a biconcave negative lens L4, a biconvex positive lens L5, and a biconcave negative lens L6. The third lens unit G3 is composed of a biconvex positive lens L7, a positive meniscus lens L8 having a convex surface directed toward the object side, a negative meniscus lens L9 having a convex surface directed toward the object side, and a biconvex positive lens L10. The fourth lens unit G4 is composed of a biconcave negative lens L11. The fifth lens unit G5 is composed of a biconvex positive lens L12. The lens elements in each lens unit are arranged in the mentioned order from the object side.

There are five aspheric surfaces, which include the image side surface of the biconvex positive lens L2, the object side surface of the biconcave negative lens L4, both surfaces of the biconvex positive lens L7, and the image side surface of the biconvex positive lens L12.

As shown in FIGS. 4A, 4B, and 4C, the zoom lens according to the fourth example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 moves toward the image side, the third lens unit G3 moves toward the object side, the fourth lens unit G4 moves toward the object side, the fifth lens unit G5 moves toward the image side, and the aperture stop S moves toward the object side.

The first lens unit G1 is composed of a negative meniscus lens L1 having a convex surface directed toward the object side and a biconvex positive lens L2. The second lens unit G2 is composed of a biconcave negative lens L3, a biconcave negative lens L4, and a biconvex positive lens L5. The third lens unit G3 is composed of a biconvex positive lens L6, a negative meniscus lens L7 having a convex surface directed toward the object side, and a biconvex positive lens L8. The negative meniscus lens L7 and the biconvex positive lens L8 are cemented together. The fourth lens unit G4 is composed of a negative meniscus lens L9 having a convex surface directed toward the object side. The fifth lens unit G5 is composed of a biconvex positive lens L10. The lens elements in each lens unit are arranged in the mentioned order from the object side.

There are eight aspheric surfaces, which include both surfaces of the negative meniscus lens L1, both surfaces of the biconvex positive lens L2, the object side surface of the biconcave negative lens L4, both surfaces of the biconvex positive lens L6, and the image side surface of the biconvex positive lens L10.

As shown in FIGS. 5A, 5B, and 5C, the zoom lens according to the fifth example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 moves toward the image side, the third lens unit G3 moves toward the object side, the fourth lens unit G4 moves toward the object side, the fifth lens unit G5 moves toward the image side, and the aperture stop S moves toward the object side.

The first lens unit G1 is composed of a negative meniscus lens L1 having a convex surface directed toward the object side and a biconvex positive lens L2. The second lens unit G2 is composed of a biconcave negative lens L3, a biconvex positive lens L4, and a biconcave negative lens L5. The third lens unit G3 is composed of a biconvex positive lens L6, a biconvex positive lens L7, a biconcave negative lens L8, and a biconvex positive lens L9. The biconvex positive lens L7 and the biconcave negative lens L8 are cemented together. The fourth lens unit G4 is composed of a biconcave negative lens L10. The fifth lens unit G5 is composed of a positive meniscus lens L11 having a convex surface directed toward the image side. The lens elements in each lens unit are arranged in the mentioned order from the object side.

There are nine aspheric surfaces, which include both surfaces of the biconvex positive lens L2, both surfaces of the biconvex positive lens L4, both surfaces of the biconcave negative lens L5, both surfaces of the biconvex positive lens L6, and the image side surface of the positive meniscus lens L11.

As shown in FIGS. 6A, 6B, and 6C, the zoom lens according to the sixth example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power. A virtual object surface (the first surface) is not shown in the drawings.

During zooming from the wide angle end to the telephoto end, the first lens unit G1 moves toward the object side, the second lens unit G2 moves toward the image side, the third lens unit G3 moves toward the object side, the fourth lens unit G4 moves toward the object side, the fifth lens unit G5 moves toward the image side, and the aperture stop S moves toward the object side.

The first lens unit G1 is composed of a negative meniscus lens L1 having a convex surface directed toward the object side and a biconvex positive lens L2. The second lens unit G2 is composed of a biconcave negative lens L3, a biconcave negative lens L4, and a biconvex positive lens L5. The third lens unit G3 is composed of a biconvex positive lens L6, a biconvex positive lens L7, a biconcave negative lens L8, and a biconvex positive lens L9. The biconvex positive lens L7 and the biconcave negative lens L8 are cemented together. The fourth lens unit G4 is composed of a biconcave negative lens L10. The fifth lens unit G5 is composed of a positive meniscus lens L11 having a convex surface directed toward the image side. The lens elements in each lens unit are arranged in the mentioned order from the object side.

There are seven aspheric surfaces, which include both surfaces of the biconvex positive lens L2, the object side surface of the biconcave negative lens L4, both surfaces of the biconvex positive lens L6, and both surfaces of the positive meniscus lens L11.

As shown in FIGS. 7A, 7B, and 7C, the zoom lens according to the seventh example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 moves toward the image side, the third lens unit G3 moves toward the object side, the fourth lens unit G4 moves toward the object side and thereafter moves toward the image side, the fifth lens unit G5 moves toward the object side and thereafter moves toward the image side, and the aperture stop S moves toward the object side.

The first lens unit G1 is composed of a negative meniscus lens L1 having a convex surface directed toward the object side and a biconvex positive lens L2. The second lens unit G2 is composed of a biconcave negative lens L3, a negative meniscus lens L4 having a convex surface directed toward the object side, a biconvex positive lens L5, and a biconcave negative lens L6. The third lens unit G3 is composed of a biconvex positive lens L7, a biconvex positive lens L8, a biconcave negative lens L9, and a biconvex positive lens L10. The biconvex positive lens L8 and the biconcave negative lens L9 are cemented together. The fourth lens unit G4 is composed of a negative meniscus lens L11 having a convex surface directed toward the object side. The fifth lens unit G5 is composed of a positive meniscus lens L12 having a convex surface directed toward the image side. The lens elements in each lens unit are arranged in the mentioned order from the object side.

There are seven aspheric surfaces, which include both surfaces of the biconvex positive lens L2, the object side surface of the negative meniscus lens L4, both surfaces of the biconvex positive lens L7, and both surfaces of the positive meniscus lens L12.

As shown in FIGS. 8A, 8B, and 8C, the zoom lens according to the eighth example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 moves toward the image side, the third lens unit G3 moves toward the object side, the fourth lens unit G4 moves toward the object side, the fifth lens unit G5 moves toward the image side, and the aperture stop S moves toward the object side.

The first lens unit G1 is composed of a negative meniscus lens L1 having a convex surface directed toward the object side and a biconvex positive lens L2. The second lens unit G2 is composed of a biconcave negative lens L3, a biconcave negative lens L4, and a biconvex positive lens L5. The third lens unit G3 is composed of a biconvex positive lens L6, a biconvex positive lens L7, a biconcave negative lens L8, and a biconvex positive lens L9. The biconvex positive lens L7 and the biconcave negative lens L8 are cemented together. The fourth lens unit G4 is composed of a biconcave negative lens L10. The fifth lens unit G5 is composed of a biconvex positive lens L11. The lens elements in each lens unit are arranged in the mentioned order from the object side.

There are seven aspheric surfaces, which include both surfaces of the biconvex positive lens L2, both surfaces of the biconcave negative lens L4, both surfaces of the biconvex positive lens L6, and the image side surface of the biconvex positive lens L11.

Numerical data of each embodiment described above is shown below. Apart from symbols described above, fb denotes a back focus, f1, f2, . . . denotes a focal length of each lens unit, FNO denotes an F number, ω denotes a half image angle, r denotes radius of curvature of each lens surface, d denotes a distance between two lenses, nd denotes a refractive index of each lens for a d-line, and vd denotes an Abbe's number for each lens. The overall length of the lens system which will be described later is a length which is obtained by adding the back focus to a distance from the first lens surface up to the last lens surface. "fb" (back focus) is a unit which is expressed upon air conversion of a distance from the last lens surface up to a paraxial image plane.

A shape of the aspheric surface is described by the following expression (I) using each aspherical surface coefficient in each embodiment, when Z is let to be an optical axis in which a light passing direction is let to be a positive direction, and Y is let to be a direction orthogonal to the optical axis.

$$Z=(Y^2/r)/[1+\{1-(K+1)(Y/r)^2\}^{1/2}]+A_4Y^4+A_6Y^6+A_8Y^8+A_{10}Y^{10} \quad (I)$$

where, r denotes a paraxial radius of curvature, K denotes a conical coefficient, $A_4$, $A_6$, $A_8$, and $A_{10}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Numerical Example 1

Unit mm

Surface data

| Surface no. | r | d | nd | vd |
|---|---|---|---|---|
| Object plane | ∞ | ∞ | | |
| 1 | 28.316 | 0.70 | 1.92286 | 20.88 |
| 2 | 20.781 | 0.10 | | |
| 3* | 17.990 | 2.80 | 1.59282 | 68.63 |
| 4* | −72.292 | Variable | | |
| 5 | −63.768 | 0.40 | 2.00100 | 29.13 |
| 6 | 9.706 | 1.75 | | |
| 7* | −40.569 | 0.40 | 1.72903 | 54.04 |
| 8 | 10.060 | 2.15 | 1.94595 | 17.98 |
| 9 | −64.282 | 0.60 | | |
| 10 | −14.698 | 0.40 | 1.88300 | 40.80 |
| 11 | −52.918 | Variable | | |
| 12 (stop) | ∞ | 0.20 | | |
| 13* | 5.427 | 1.60 | 1.59201 | 67.02 |
| 14* | −41.053 | 0.38 | | |
| 15 | 7.909 | 0.81 | 1.65160 | 58.55 |
| 16 | 9.194 | 0.32 | 2.00069 | 25.46 |
| 17 | 4.577 | 0.40 | | |
| 18 | 8.245 | 1.20 | 1.69680 | 55.53 |
| 19 | −55.924 | Variable | | |
| 20 | 100.386 | 0.38 | 1.65160 | 58.55 |
| 21 | 5.404 | Variable | | |
| 22 | 89.154 | 1.92 | 1.69350 | 53.21 |
| 23* | −9.106 | Variable | | |
| 24 | ∞ | 0.30 | 1.51633 | 64.14 |
| 25 | ∞ | 0.40 | | |
| 26 | ∞ | 0.50 | 1.51633 | 64.14 |
| 27 | ∞ | 0.53 | | |
| Image plane (Light receiving surface) | ∞ | | | |

Aspherical surface data

3rd surface

K = 0.000
A4 = −4.85430e−06, A6 = 3.27528e−08, A8 = 2.01131e−10

4th surface

K = 0.000
A4 = 9.58006e−06, A6 = 5.17154e−08

7th surface

K = −108.071
A4 = −7.36982e−05, A6 = 4.29192e−06, A8 = −4.87693e−08

13th surface

K = 0.000
A4 = −5.33289e−04, A6 = −7.06333e−06, A8 = −3.68233e−07

14th surface

K = 0.000
A4 = 3.43038e−04, A6 = −3.34905e−06, A8 = 1.28017e−07

23th surface

K = 0.000
A4 = 6.81915e−04, A6 = −9.11597e−06, A8 = 4.96046e−08

Zoom data

| | WE | ST | TE |
|---|---|---|---|
| Focal length | 4.56 | 20.88 | 87.45 |
| FNO. | 2.98 | 4.93 | 6.97 |
| Angle of field 2ω | 81.46 | 19.21 | 4.92 |
| Image height | 3.40 | 3.86 | 3.86 |
| fb (in air) | 4.76 | 3.94 | 1.86 |
| Lens total length (in air) | 45.57 | 50.94 | 58.97 |
| d4 | 0.35 | 10.81 | 20.40 |
| d11 | 18.31 | 5.88 | 0.10 |
| d19 | 1.90 | 4.21 | 4.13 |
| d21 | 3.73 | 9.58 | 15.96 |
| d23 | 3.30 | 2.48 | 0.40 |

Unit focal length f1 = 34.35    f2 = −6.44    f3 = 7.73    f4 = −8.78    f5 = 12.01

Numerical Example 2

Unit mm

Surface data

| Surface no. | r | d | nd | vd |
|---|---|---|---|---|
| Object plane | ∞ | ∞ | | |
| 1 | 23.596 | 0.50 | 2.00170 | 20.60 |
| 2 | 16.496 | 0.10 | | |
| 3* | 14.964 | 3.10 | 1.72916 | 54.68 |
| 4* | −582.501 | Variable | | |
| 5 | −127.826 | 0.28 | 1.88300 | 40.76 |
| 6 | 6.336 | 2.40 | | |
| 7* | −12.366 | 0.44 | 1.74320 | 49.34 |
| 8 | 13.831 | 0.05 | | |
| 9 | 11.670 | 1.70 | 1.94595 | 17.98 |
| 10* | −182.398 | Variable | | |
| 11(stop) | ∞ | 0.66 | | |
| 12* | 6.065 | 1.64 | 1.58313 | 59.38 |
| 13* | −37.023 | 0.30 | | |
| 14 | 16.940 | 1.00 | 1.58313 | 59.38 |
| 15 | 88.444 | 0.10 | | |
| 16 | 102.253 | 0.30 | 1.90366 | 34.00 |
| 17 | 4.820 | 0.10 | | |
| 18 | 5.142 | 1.87 | 1.58313 | 59.38 |
| 19* | −15.863 | Variable | | |
| 20 | 362039.377 | 0.50 | 1.53110 | 55.91 |
| 21 | 5.257 | Variable | | |
| 22 | 141.877 | 2.50 | 1.53110 | 55.91 |
| 23* | −6.454 | Variable | | |
| 24 | ∞ | 0.30 | 1.51633 | 64.14 |
| 25 | ∞ | 0.40 | | |
| 26 | ∞ | 0.50 | 1.51633 | 64.14 |
| 27 | ∞ | 0.53 | | |
| Image plane (Light receiving surface) | ∞ | | | |

Aspherical surface data

3rd surface

K = 0.000
A4 = −5.30273e−06, A6 = −4.71943e−08, A8 = −8.92165e−11

4th surface

K = 0.000
A4 = 6.58637e−06, A6 = −3.13826e−08, A8 = 1.81998e−10

7th surface

K = 0.000
A4 = 1.82460e−04, A6 = 4.29807e−06, A8 = −2.37813e−08

10th surface

K = 0.000
A4 = 6.54830e−05, A6 = 1.88605e−06

-continued

Unit mm

12th surface

K = 0.000
A4 = −2.32743e−04, A6 = 1.71429e−06, A8 = −9.76141e−08,
A10 = 1.87507e−08
13th surface K = 0.000
A4 = 3.86750e−04, A6 = −6.12440e−07, A8 = 1.67085e−07,
A10 = 8.65302e−09
19th surface K = 0.000
A4 = 1.59977e−04, A6 = 7.15466e−06
23th surface K = 0.000
A4 = 1.00416e−03, A6 = −1.31391e−06, A8 = −3.62695e−07,
A10 = 1.41161e−08

Zoom data

|  | WE | ST | TE |
|---|---|---|---|
| Focal length | 4.37 | 18.81 | 84.77 |
| FNO. | 3.11 | 4.36 | 6.69 |
| Angle of field 2ω | 82.85 | 21.55 | 5.14 |
| Image height | 3.39 | 3.86 | 3.86 |
| fb (in air) | 5.22 | 4.61 | 2.52 |
| Lens total length (in air) | 54.59 | 54.12 | 61.02 |
| d4 | 0.45 | 10.27 | 18.02 |
| d10 | 22.12 | 7.08 | 0.54 |
| d19 | 2.45 | 7.19 | 10.72 |
| d21 | 6.79 | 7.42 | 11.66 |
| d23 | 3.77 | 3.15 | 1.07 |

Unit focal length f1 = 31.40  f2 = −5.56  f3 = 9.07  f4 = −9.90  f5 = 11.69

Numerical Example 3

Unit mm

Surface data

| Surface no. | r | d | nd | vd |
|---|---|---|---|---|
| Object plane | ∞ | ∞ | | |
| 1 | 18.295 | 0.70 | 1.94595 | 17.98 |
| 2 | 15.851 | 0.10 | | |
| 3 | 15.851 | 3.20 | 1.49700 | 81.54 |
| 4* | −71.909 | Variable | | |
| 5 | −56.757 | 0.30 | 1.88300 | 40.76 |
| 6 | 6.602 | 2.30 | | |
| 7* | −40.246 | 0.40 | 1.74320 | 49.34 |
| 8 | 25.058 | 0.10 | | |
| 9 | 12.886 | 1.50 | 1.94595 | 17.98 |
| 10 | −547.191 | 0.35 | | |
| 11 | −29.955 | 0.30 | 1.83481 | 42.71 |
| 12 | 75.965 | Variable | | |
| 13(stop) | ∞ | 0.00 | | |
| 14* | 4.867 | 1.60 | 1.58313 | 59.38 |
| 15* | −27.904 | 0.30 | | |
| 16 | 17.068 | 0.90 | 1.61881 | 63.85 |
| 17 | 2236.619 | 0.00 | | |
| 18 | 2236.619 | 0.30 | 1.91082 | 35.25 |
| 19 | 4.074 | 0.20 | | |
| 20 | 4.719 | 1.49 | 1.58313 | 59.38 |
| 21 | −13.320 | Variable | | |
| 22 | −2972.620 | 0.40 | 1.74320 | 49.34 |
| 23 | 5.590 | Variable | | |
| 24 | 60.000 | 2.20 | 1.74320 | 49.34 |

-continued

Unit mm

| | | | | |
|---|---|---|---|---|
| 25* | −9.500 | Variable | | |
| 26 | ∞ | 0.30 | 1.51633 | 64.14 |
| 27 | ∞ | 0.40 | | |
| 28 | ∞ | 0.50 | 1.51633 | 64.14 |
| 29 | ∞ | 0.53 | | |
| Image plane (Light receiving surface) | ∞ | | | |

Aspherical surface data

4th surface

K = 0.000
A4 = 1.87035e−05, A6 = −2.10391e−08, A8 = 5.48618e−13
7th surface

K = 0.000
A4 = 1.81191e−04, A6 = −1.66031e−06, A8 = 1.65462e−07
14th surface

K = 0.000
A4 = −4.11881e−04, A6 = 6.21513e−07, A8 = 1.02195e−07,
A10 = −3.38270e−08
15th surface K = 0.000
A4 = 8.41667e−04, A6 = −1.83259e−21
25th surface K = 0.000
A4 = 4.96859e−04, A6 = −7.38374e−06, A8 = 8.49509e−08,
A10 = −7.26513e−28

Zoom data

|  | WE | ST | TE |
|---|---|---|---|
| Focal length | 4.44 | 18.81 | 84.77 |
| FNO. | 3.62 | 6.05 | 7.02 |
| Angle of field 2ω | 82.33 | 21.40 | 4.91 |
| Image height | 3.39 | 3.86 | 3.86 |
| fb (in air) | 4.73 | 4.65 | 4.62 |
| Lens total length (in air) | 46.21 | 50.88 | 59.97 |
| d4 | 0.30 | 8.85 | 20.35 |
| d12 | 18.92 | 6.64 | 0.30 |
| d21 | 3.10 | 5.74 | 5.24 |
| d23 | 2.52 | 8.36 | 12.82 |
| d25 | 3.28 | 3.19 | 3.17 |

Unit focal length f1 = 32.93  f2 = −5.90  f3 = 8.06  f4 = −7.51  f5 = 11.19

Numerical Example 4

Unit mm

Surface data

| Surface no. | r | d | nd | vd |
|---|---|---|---|---|
| Object plane | ∞ | ∞ | | |
| 1* | 36.630 | 0.80 | 1.63493 | 23.90 |
| 2* | 20.718 | 0.10 | | |
| 3* | 19.512 | 4.24 | 1.53110 | 55.91 |
| 4* | −74.795 | Variable | | |
| 5 | −85.585 | 0.40 | 2.00100 | 29.13 |
| 6 | 7.876 | 2.59 | | |
| 7* | −9.437 | 0.45 | 1.53110 | 55.91 |
| 8 | 20.186 | 0.16 | | |
| 9 | 19.510 | 1.62 | 1.94595 | 17.98 |
| 10 | −36.109 | Variable | | |
| 11(stop) | ∞ | 0.66 | | |

-continued

Unit mm

| | | | | |
|---|---|---|---|---|
| 12* | 6.526 | 2.08 | 1.58313 | 59.38 |
| 13* | −32.693 | 1.32 | | |
| 14 | 12.419 | 0.43 | 1.90366 | 31.32 |
| 15 | 4.456 | 3.06 | 1.48749 | 70.23 |
| 16 | −20.011 | Variable | | |
| 17 | 48.103 | 0.40 | 1.53110 | 55.91 |
| 18 | 5.768 | Variable | | |
| 19 | 106.839 | 2.06 | 1.53110 | 55.91 |
| 20* | −9.631 | Variable | | |
| 21 | ∞ | 0.30 | 1.51633 | 64.14 |
| 22 | ∞ | 0.40 | | |
| 23 | ∞ | 0.50 | 1.51633 | 64.14 |
| 24 | ∞ | 0.53 | | |
| Image plane (Light receiving surface) | ∞ | | | |

Aspherical surface data

1st surface $K = 0.000$
$A4 = 2.10454e-06, A6 = -4.39811e-08, A8 = -3.52996e-10$ 2nd surface $K = 0.000$
$A4 = -1.19227e-05, A6 = -5.88991e-09, A8 = -5.42899e-10$ 3rd surface $K = 0.000$
$A4 = -2.33415e-05, A6 = 2.00844e-08, A8 = -2.04114e-10$ 4th surface $K = 0.000$
$A4 = -6.95768e-07, A6 = -2.14934e-08, A8 = -3.00803e-11$ 7th surface $K = 0.000$
$A4 = 1.34479e-04, A6 = 3.28040e-06, A8 = -7.12919e-08$ 12th surface $K = 0.000$
$A4 = -3.37024e-04, A6 = 9.95054e-06, A8 = -1.33615e-06,$
$A10 = 5.24597e-08$ 13th surface $K = 0.000$
$A4 = 2.53182e-04, A6 = 1.40851e-05, A8 = -1.72563e-06,$
$A10 = 7.58000e-08$ 20th surface $K = 0.000$
$A4 = 4.46336e-04, A6 = 1.52757e-05, A8 = -1.30553e-06,$
$A10 = 2.48676e-08$ Zoom data

| | WE | ST | TE |
|---|---|---|---|
| Focal length | 4.55 | 20.95 | 87.43 |
| FNO. | 2.80 | 4.97 | 6.61 |
| Angle of field 2ω | 81.77 | 19.76 | 4.88 |
| Image height | 3.39 | 3.86 | 3.86 |
| fb (in air) | 5.43 | 3.34 | 2.57 |
| Lens total length (in air) | 51.22 | 62.22 | 76.53 |
| d4 | 0.45 | 15.30 | 30.32 |
| d10 | 20.11 | 6.95 | 0.54 |
| d16 | 2.00 | 4.49 | 5.73 |

-continued

Unit mm

| | | | |
|---|---|---|---|
| d18 | 2.86 | 11.78 | 17.00 |
| d20 | 3.98 | 1.88 | 1.11 |

Unit focal length f1 = 48.20  f2 = −7.15  f3 = 9.46  f4 = −12.38  f5 = 16.74

Numerical Example 5

Unit mm

Surface data

| Surface no. | r | d | nd | νd |
|---|---|---|---|---|
| Object plane | ∞ | ∞ | | |
| 1 | 16.404 | 0.80 | 1.80810 | 22.76 |
| 2 | 14.066 | 0.10 | | |
| 3* | 12.768 | 3.71 | 1.43875 | 94.93 |
| 4* | −94.494 | Variable | | |
| 5 | −1187.563 | 0.40 | 2.00100 | 29.13 |
| 6 | 6.542 | 3.00 | | |
| 7* | 92.576 | 1.80 | 2.10300 | 18.05 |
| 8* | −15.441 | 0.19 | | |
| 9* | −10.497 | 0.40 | 1.72903 | 54.04 |
| 10* | 66.198 | Variable | | |
| 11(stop) | ∞ | 0.66 | | |
| 12* | 5.393 | 1.53 | 1.61881 | 63.85 |
| 13* | −26.412 | 0.83 | | |
| 14 | 16.838 | 1.00 | 1.58267 | 46.42 |
| 15 | −81.020 | 0.40 | 1.91082 | 35.25 |
| 16 | 3.923 | 0.12 | | |
| 17 | 4.201 | 1.79 | 1.51633 | 64.14 |
| 18 | −9.498 | Variable | | |
| 19 | −17.541 | 0.40 | 1.72916 | 54.68 |
| 20 | 6.839 | Variable | | |
| 21 | −870.491 | 1.98 | 1.74320 | 49.29 |
| 22* | −8.469 | Variable | | |
| 23 | ∞ | 0.30 | 1.51633 | 64.14 |
| 24 | ∞ | 0.40 | | |
| 25 | ∞ | 0.50 | 1.51633 | 64.14 |
| 26 | ∞ | 0.53 | | |
| Image plane (Light receiving surface) | ∞ | | | |

Aspherical surface data

3rd surface $K = -0.050$
$A4 = -2.18258e-05, A6 = -2.42987e-08$

4th surface $K = 0.000$
$A4 = 1.68062e-06, A6 = 9.96269e-08$

7th surface $K = 0.000$
$A4 = -2.14200e-04, A6 = -1.33123e-05$

8th surface $K = 0.000$
$A4 = -4.55648e-04, A6 = -5.03409e-06$

9th surface $K = -0.346$
$A4 = 2.65954e-04, A6 = -1.38245e-05$

10th surface $K = 0.000$
$A4 = 3.63978e-04, A6 = -2.40843e-05$

-continued

Unit mm

12th surface

K = 0.032
A4 = −3.72331e−04, A6 = −1.62761e−05, A8 = 5.32199e−07
13th surface

K = 0.000
A4 = 6.57111e−04, A6 = −2.04252e−05, A8 = 9.69213e−07
22th surface

K = 0.146
A4 = 5.00654e−04, A6 = −1.67500e−06

Zoom data

|  | WE | ST | TE |
|---|---|---|---|
| Focal length | 4.55 | 20.00 | 87.83 |
| FNO. | 3.81 | 6.40 | 6.95 |
| Angle of field 2ω | 81.12 | 20.95 | 4.94 |
| Image height | 3.39 | 3.86 | 3.86 |
| fb (in air) | 4.26 | 3.69 | 2.45 |
| Lens total length (in air) | 49.70 | 52.05 | 55.72 |
| d4 | 0.12 | 9.03 | 19.88 |
| d10 | 21.62 | 7.73 | 0.14 |
| d18 | 3.09 | 4.80 | 3.31 |
| d20 | 1.50 | 7.68 | 10.83 |
| d22 | 2.81 | 2.23 | 1.00 |

Unit focal length f1 = 32.33  f2 = −6.60  f3 = 8.44  f4 = −6.70  f5 = 11.50

Numerical Example 6

Unit mm

Surface data

| Surface no. | r | d | nd | vd |
|---|---|---|---|---|
| Object plane | ∞ | ∞ | | |
| 1 | ∞ | 0.00 | | |
| 2 | 23.150 | 0.80 | 1.80810 | 22.76 |
| 3 | 17.932 | 0.10 | | |
| 4* | 14.372 | 4.10 | 1.49700 | 81.54 |
| 5* | −139.631 | Variable | | |
| 6 | −1627.983 | 0.39 | 1.88300 | 40.80 |
| 7 | 6.623 | 3.03 | | |
| 8* | −15.325 | 0.40 | 1.74320 | 49.29 |
| 9 | 18.414 | 0.09 | | |
| 10 | 15.353 | 1.90 | 1.94595 | 17.98 |
| 11 | −91.881 | Variable | | |
| 12(stop) | ∞ | 1.00 | | |
| 13* | 6.731 | 2.30 | 1.59201 | 67.02 |
| 14* | −26.537 | 0.10 | | |
| 15 | 7.961 | 1.94 | 1.57135 | 52.95 |
| 16 | −14.641 | 0.30 | 1.91082 | 35.25 |
| 17 | 5.518 | 0.53 | | |
| 18 | 12.864 | 1.40 | 1.53110 | 55.91 |
| 19 | −20.728 | Variable | | |
| 20 | −12.751 | 0.35 | 1.53110 | 55.91 |
| 21 | 25.974 | Variable | | |
| 22* | −422.120 | 2.31 | 1.53110 | 55.91 |
| 23* | −7.273 | Variable | | |
| 24 | ∞ | 0.30 | 1.51633 | 64.14 |
| 25 | ∞ | 0.40 | | |
| 26 | ∞ | 0.50 | 1.51633 | 64.14 |
| 27 | ∞ | 0.53 | | |
| Image plane (Light receiving surface) | ∞ | | | |

Aspherical surface data

4th surface

K = 0.000
A4 = −2.08123e−05, A6 = −3.05414e−08
5th surface

K = 0.000
A4 = −2.31823e−06, A6 = 8.57958e−08
8th surface

K = 0.000
A4 = 9.29998e−05, A6 = 1.48758e−06
13th surface

K = 0.000
A4 = −1.95212e−04, A6 = −3.30607e−06, A8 = 6.34341e−08
14th surface

K = 0.000
A4 = 1.24066e−04, A6 = −2.21634e−06, A8 = 1.70957e−07
22th surface

K = 0.000
A4 = −4.38005e−04, A6 = 1.28908e−05
23th surface

K = 0.000
A4 = 1.62365e−04, A6 = 1.53461e−05

Zoom data

|  | WE | ST | TE |
|---|---|---|---|
| Focal length | 4.56 | 21.80 | 113.66 |
| FNO. | 2.67 | 4.43 | 7.08 |
| Angle of field 2ω | 81.81 | 19.45 | 3.95 |
| Image height | 3.44 | 3.86 | 3.86 |
| fb (in air) | 7.91 | 5.67 | 2.36 |
| Lens total length (in air) | 55.65 | 61.61 | 69.99 |
| d5 | 0.27 | 11.78 | 21.30 |
| d11 | 22.18 | 7.83 | 0.10 |
| d19 | 2.12 | 10.42 | 12.61 |
| d21 | 2.12 | 4.86 | 12.57 |
| d23 | 6.46 | 4.21 | 0.90 |

Unit focal length f1 = 35.86  f2 = −6.55  f3 = 11.25  f4 = −16.05  f5 = 13.91

Numerical Example 7

Unit mm

Surface data

| Surface no. | r | d | nd | vd |
|---|---|---|---|---|
| Object plane | ∞ | ∞ | | |
| 1 | 50.628 | 0.70 | 1.91082 | 35.25 |
| 2 | 21.986 | 0.10 | | |
| 3* | 15.690 | 4.10 | 1.55087 | 71.79 |
| 4* | −41.939 | Variable | | |
| 5 | −32.010 | 0.39 | 1.88300 | 40.76 |
| 6 | 6.924 | 1.53 | | |
| 7* | 36.748 | 0.40 | 1.74320 | 49.29 |

-continued

| Unit mm | | | | |
|---|---|---|---|---|
| 8 | 12.347 | 0.10 | | |
| 9 | 11.062 | 1.95 | 1.94595 | 17.98 |
| 10 | −4083.155 | 0.50 | | |
| 11 | −21.333 | 0.41 | 1.83481 | 42.71 |
| 12 | 191.160 | Variable | | |
| 13(stop) | ∞ | 0.20 | | |
| 14* | 6.121 | 2.06 | 1.67790 | 54.89 |
| 15* | −26.116 | 0.04 | | |
| 16 | 9.978 | 1.69 | 1.52249 | 59.84 |
| 17 | −8.574 | 0.38 | 1.91082 | 35.25 |
| 18 | 5.449 | 0.27 | | |
| 19 | 7.954 | 1.56 | 1.53110 | 55.91 |
| 20 | −10.220 | Variable | | |
| 21 | 98.285 | 0.36 | 1.53110 | 55.91 |
| 22 | 4.892 | Variable | | |
| 23* | −544.817 | 2.45 | 1.53110 | 55.91 |
| 24* | −6.977 | Variable | | |
| 25 | ∞ | 0.30 | 1.51633 | 64.14 |
| 26 | ∞ | 0.40 | | |
| 27 | ∞ | 0.50 | 1.51633 | 64.14 |
| 28 | ∞ | 0.53 | | |
| Image plane (Light receiving surface) | ∞ | | | |

Aspherical surface data

3rd surface

K = 0.000
A4 = −2.33331e−05, A6 = −8.82086e−08, A8 = −3.79850e−10
4th surface

K = 0.000
A4 = 5.65699e−06, A6 = −3.83298e−08
7th surface

K = 0.000
A4 = 3.44232e−04, A6 = 1.57622e−06, A8 = 1.91155e−07
14th surface

K = 0.000
A4 = −2.33678e−04, A6 = 1.09430e−06, A8 = −7.33405e−09
15th surface

K = 0.000
A4 = 2.47542e−04, A6 = −2.25993e−07
23th surface

K = 0.000
A4 = −1.94039e−04, A6 = −6.12963e−06
24th surface

K = −2.234
A4 = −5.41577e−04, A6 = −2.49015e−06, A8 = −1.59781e−07

Zoom data

| | WE | ST | TE |
|---|---|---|---|
| Focal length | 4.55 | 21.72 | 113.65 |
| FNO. | 3.25 | 5.46 | 7.15 |
| Angle of field 2ω | 81.13 | 19.04 | 3.86 |
| Image height | 3.40 | 3.86 | 3.86 |
| fb (in air) | 5.97 | 6.38 | 2.56 |
| Lens total length (in air) | 51.53 | 60.29 | 68.29 |
| d4 | 0.45 | 13.14 | 27.39 |
| d12 | 20.77 | 6.87 | 0.10 |
| d20 | 2.15 | 6.40 | 8.53 |
| d22 | 3.00 | 8.32 | 10.52 |
| d24 | 4.51 | 4.92 | 1.10 |

Unit focal length f1 = 40.87  f2 = −6.28  f3 = 8.94  f4 = −9.71  f5 = 13.29

Numerical Example 8

| Unit mm | | | | |
|---|---|---|---|---|
| Surface data | | | | |
| Surface no. | r | d | nd | vd |
| Object plane | ∞ | ∞ | | |
| 1 | 24.128 | 1.00 | 1.90366 | 31.32 |
| 2 | 18.091 | 0.10 | | |
| 3* | 16.314 | 3.90 | 1.49700 | 81.54 |
| 4* | −103.977 | Variable | | |
| 5 | −148.933 | 0.50 | 2.00100 | 29.13 |
| 6 | 6.961 | 2.46 | | |
| 7* | −10.446 | 0.50 | 1.72903 | 54.04 |
| 8* | 127.312 | 0.14 | | |
| 9 | 27.188 | 1.99 | 1.94595 | 17.98 |
| 10 | −24.426 | Variable | | |
| 11(stop) | ∞ | 0.66 | | |
| 12* | 6.246 | 2.20 | 1.58313 | 59.38 |
| 13* | −25.432 | 0.32 | | |
| 14 | 12.829 | 1.64 | 1.58913 | 61.14 |
| 15 | −68.791 | 0.50 | 1.91082 | 35.25 |
| 16 | 4.508 | 0.13 | | |
| 17 | 4.806 | 2.29 | 1.51633 | 64.14 |
| 18 | −11.910 | Variable | | |
| 19 | −43.457 | 0.52 | 1.53110 | 55.91 |
| 20 | 5.682 | Variable | | |
| 21 | 106.839 | 2.35 | 1.53110 | 55.91 |
| 22* | −9.301 | Variable | | |
| 23 | ∞ | 0.30 | 1.51633 | 64.14 |
| 24 | ∞ | 0.40 | | |
| 25 | ∞ | 0.50 | 1.51633 | 64.14 |
| 26 | ∞ | 0.53 | | |
| Image plane (Light receiving surface) | ∞ | | | |

Aspherical surface data

3rd surface

K = 0.000
A4 = −9.99155e−06, A6 = 2.07988e−09
4th surface

K = 0.000
A4 = −5.70393e−07, A6 = 3.98849e−08
7th surface

K = 0.000
A4 = −4.46296e−05, A6 = 1.37943e−06
8th surface

K = 0.000
A4 = −1.23087e−04, A6 = 1.74020e−06
12th surface

K = 0.000
A4 = −2.91745e−04, A6 = −4.15026e−07, A8 = 3.94390e−09
13th surface

K = 0.000
A4 = 4.23024e−04, A6 = 6.65256e−07, A8 = 3.11395e−08
22th surface

K = 0.000
A4 = 3.90756e−04, A6 = −4.28271e−06

Zoom data

| | WE | ST | TE |
|---|---|---|---|
| Focal length | 4.55 | 19.86 | 87.83 |
| FNO. | 3.07 | 5.13 | 6.72 |
| Angle of field 2ω | 81.82 | 21.08 | 4.94 |
| Image height | 3.39 | 3.86 | 3.86 |
| fb (in air) | 5.55 | 4.04 | 2.44 |

-continued

| Unit mm | | | |
|---|---|---|---|
| Lens total length (in air) | 52.46 | 58.20 | 69.69 |
| d4 | 0.34 | 12.88 | 27.24 |
| d10 | 21.76 | 6.96 | 0.10 |
| d18 | 2.09 | 4.47 | 4.86 |
| d20 | 1.50 | 8.64 | 13.84 |
| d22 | 4.11 | 2.60 | 1.00 |

Unit focal length f1 = 43.77   f2 = −7.25   f3 = 9.13   f4 = −9.43   f5 = 16.22

FIGS. 9A to 9L, 10A to 10L, 11A to 11L, 12A to 12L, 13A to 13L, 14A to 14L, 15A to 15L, and 16A to 16L respectively show aberrations of the zoom lenses according to the first to eighth examples in the state in which the zoom lenses are focused on an object point at infinity. FIGS. 9A to 9L are aberration diagrams of the zoom lens according to the first example in the state in which the zoom lens is focused on an object point at infinity. FIGS. 9A, 9B, 9C, and 9D respectively show spherical aberration (SA), astigmatism (AS), distortion (DT), and chromatic aberration of magnification (CC) at the wide angle end. FIGS. 9E, 9F, 9G, and 9H respectively show spherical aberration, astigmatism, distortion, and chromatic aberration of magnification of the zoom lens in the intermediate focal length state. FIGS. 9I, 9J, 9K, and 9L respectively show spherical aberration, astigmatism, distortion, and chromatic aberration of magnification of the zoom lens at the telephoto end. FIGS. 10A to 10L are aberration diagrams of the zoom lens according to the second example in the state in which the zoom lens is focused on an object point at infinity. FIGS. 10A, 10B, 10C, and 10D respectively show spherical aberration, astigmatism, distortion, and chromatic aberration of magnification of the zoom lens at the wide angle end. FIGS. 10E, 10F, 10G, and 10H respectively show spherical aberration, astigmatism, distortion, and chromatic aberration of magnification of the zoom lens in the intermediate focal length state. FIGS. 10I, 10J, 10K, and 10L respectively show spherical aberration, astigmatism, distortion, and chromatic aberration of magnification of the zoom lens at the telephoto end. FIGS. 11A to 11L are aberration diagrams of the zoom lens according to the third example in the state in which the zoom lens is focused on an object point at infinity. FIGS. 11A, 11B, 11C, and 11D respectively show spherical aberration, astigmatism, distortion, and chromatic aberration of magnification of the zoom lens at the wide angle end. FIGS. 11E, 11F, 11G, and 11H respectively show spherical aberration, astigmatism, distortion, and chromatic aberration of magnification of the zoom lens in the intermediate focal length state. FIGS. 11I, 11J, 11K, and 11L respectively show spherical aberration, astigmatism, distortion, and chromatic aberration of magnification of the zoom lens at the telephoto end. FIGS. 12A to 12L are aberration diagrams of the zoom lens according to the fourth example in the state in which the zoom lens is focused on an object point at infinity. FIGS. 12A, 12B, 12C, and 12D respectively show spherical aberration, astigmatism, distortion, and chromatic aberration of magnification of the zoom lens at the wide angle end. FIGS. 12E, 12F, 12G, and 12H respectively show spherical aberration, astigmatism, distortion, and chromatic aberration of magnification of the zoom lens in the intermediate focal length state. FIGS. 12I, 12J, 12K, and 12L respectively show spherical aberration, astigmatism, distortion, and chromatic aberration of magnification of the zoom lens at the telephoto end. FIGS. 13A to 13L are aberration diagrams of the zoom lens according to the fifth example in the state in which the zoom lens is focused on an object point at infinity. FIGS. 13A, 13B, 13C, and 13D respectively show spherical aberration, astigmatism, distortion, and chromatic aberration of magnification of the zoom lens at the wide angle end. FIGS. 13E, 13F, 13G, and 13H respectively show spherical aberration, astigmatism, distortion, and chromatic aberration of magnification of the zoom lens in the intermediate focal length state. FIGS. 13I, 13J, 13K, and 13L respectively show spherical aberration, astigmatism, distortion, and chromatic aberration of magnification of the zoom lens at the telephoto end. FIGS. 14A to 14L are aberration diagrams of the zoom lens according to the sixth example in the state in which the zoom lens is focused on an object point at infinity. FIGS. 14A, 14B, 14C, and 14D respectively show spherical aberration, astigmatism, distortion, and chromatic aberration of magnification of the zoom lens at the wide angle end. FIGS. 14E, 14F, 14G, and 14H respectively show spherical aberration, astigmatism, distortion, and chromatic aberration of magnification of the zoom lens in the intermediate focal length state. FIGS. 14I, 14J, 14K, and 14L respectively show spherical aberration, astigmatism, distortion, and chromatic aberration of magnification of the zoom lens at the telephoto end. FIGS. 15A to 15L are aberration diagrams of the zoom lens according to the seventh example in the state in which the zoom lens is focused on an object point at infinity. FIGS. 15A, 15B, 15C, and 15D respectively show spherical aberration, astigmatism, distortion, and chromatic aberration of magnification of the zoom lens at the wide angle end. FIGS. 15E, 15F, 15G, and 15H respectively show spherical aberration, astigmatism, distortion, and chromatic aberration of magnification of the zoom lens in the intermediate focal length state. FIGS. 15I, 15J, 15K, and 15L respectively show spherical aberration, astigmatism, distortion, and chromatic aberration of magnification of the zoom lens at the telephoto end. FIGS. 16A to 16L are aberration diagrams of the zoom lens according to the eighth example in the state in which the zoom lens is focused on an object point at infinity. FIGS. 16A, 16B, 16C, and 16D respectively show spherical aberration, astigmatism, distortion, and chromatic aberration of magnification of the zoom lens at the wide angle end. FIGS. 16E, 16F, 16G, and 16H respectively show spherical aberration, astigmatism, distortion, and chromatic aberration of magnification of the zoom lens in the intermediate focal length state. FIGS. 16I, 16J, 16K, and 16L respectively show spherical aberration, astigmatism, distortion, and chromatic aberration of magnification of the zoom lens at the telephoto end.

In aberration diagrams, ω represents the half angle of view.

Next, parameter and values of conditional expressions in each embodiments are described.

| Conditional expression | Example 1 | Example 2 | Example 3 | Example 4 |
|---|---|---|---|---|
| (1) $(L_{TLt}/\beta_{rear})/F_{LG1}$ | 0.678 | 0.723 | 0.711 | 0.878 |
| (2) $F_{LG1}/F_{Lt}$ | 0.393 | 0.370 | 0.388 | 0.551 |
| (3) $F_{LG1}/(F_{Lt} \times |\nu_{G1p} - \nu_{G1n}|)$ | 0.008 | 0.011 | 0.006 | 0.017 |
| (4) $F_{LG1}/(F_{Lt} \times |P_{G1p} - P_{G1n}|)$ | 4.732 | 4.161 | 3.317 | 6.561 |

-continued

| | | | | |
|---|---|---|---|---|
| (5) $(L_{TLt} - L_{TLw})/F_{Lt}$ | 0.153 | 0.076 | 0.162 | 0.289 |
| (6) $F_{Lt}/F_L$ | 19.19 | 19.42 | 19.11 | 19.21 |

| Conditional expression | Example 5 | Example 6 | Example 7 | Example 8 |
|---|---|---|---|---|
| (1) $(L_{TLt}/\beta_{rear})/F_{LG1}$ | 0.638 | 0.618 | 0.603 | 0.797 |
| (2) $F_{LG1}/F_{Lt}$ | 0.368 | 0.315 | 0.360 | 0.498 |
| (3) $F_{LG1}/(F_{Lt} \times |\nu_{G1p} - \nu_{G1n}|)$ | 0.005 | 0.005 | 0.010 | 0.010 |
| (4) $F_{LG1}/(F_{Lt} \times |P_{G1p} - P_{G1n}|)$ | 3.810 | 3.382 | 8.323 | 8.701 |
| (5) $(L_{TLt} - L_{TLw})/F_{Lt}$ | 0.069 | 0.126 | 0.147 | 0.196 |
| (6) $F_{Lt}/F_L$ | 19.30 | 24.94 | 24.96 | 19.30 |

| | LTLw | LTLt | $\beta$rear | FLG1 | FLW | FLt | $\nu$G1n | $\nu$G1p |
|---|---|---|---|---|---|---|---|---|
| Example 1 | 45.842 | 59.242 | 2.545 | 34.347 | 4.555 | 87.430 | 20.88 | 68.63 |
| Example 2 | 54.861 | 61.289 | 2.699 | 31.404 | 4.366 | 84.771 | 20.60 | 54.68 |
| Example 3 | 46.483 | 60.239 | 2.574 | 32.933 | 4.436 | 84.770 | 17.98 | 81.54 |
| Example 4 | 51.490 | 76.801 | 1.814 | 48.200 | 4.551 | 87.441 | 23.90 | 55.91 |
| Example 5 | 49.975 | 56.000 | 2.716 | 32.334 | 4.551 | 87.830 | 22.76 | 94.93 |
| Example 6 | 55.923 | 70.261 | 3.170 | 35.859 | 4.558 | 113.659 | 22.76 | 81.54 |
| Example 7 | 51.803 | 68.561 | 2.781 | 40.870 | 4.553 | 113.660 | 35.25 | 71.79 |
| Example 8 | 52.742 | 69.980 | 2.007 | 43.766 | 4.551 | 87.827 | 31.32 | 81.54 |

| | nCn | nFn | ngn | PG1n | nCp | nFp | ngp | PG1p |
|---|---|---|---|---|---|---|---|---|
| Example 1 | 1.9103 | 1.9545 | 1.9823 | 0.6282 | 1.5902 | 1.5988 | 1.6035 | 0.5452 |
| Example 2 | 1.9880 | 2.0365 | 2.0673 | 0.6335 | 1.7251 | 1.7384 | 1.7457 | 0.5444 |
| Example 3 | 1.9312 | 1.9838 | 2.0183 | 0.6544 | 1.4951 | 1.5012 | 1.5045 | 0.5373 |
| Example 4 | 1.6274 | 1.6540 | 1.6708 | 0.6334 | 1.5282 | 1.5377 | 1.5429 | 0.5494 |
| Example 5 | 1.7980 | 1.8335 | 1.8559 | 0.6306 | 1.4373 | 1.4420 | 1.4444 | 0.5340 |
| Example 6 | 1.7980 | 1.8335 | 1.8559 | 0.6306 | 1.4951 | 1.5012 | 1.5045 | 0.5373 |
| Example 7 | 1.9032 | 1.9291 | 1.9441 | 0.5822 | 1.5485 | 1.5562 | 1.5603 | 0.5390 |
| Example 8 | 1.8953 | 1.9241 | 1.9413 | 0.5946 | 1.4951 | 1.5012 | 1.5045 | 0.5373 |

Figure 17:
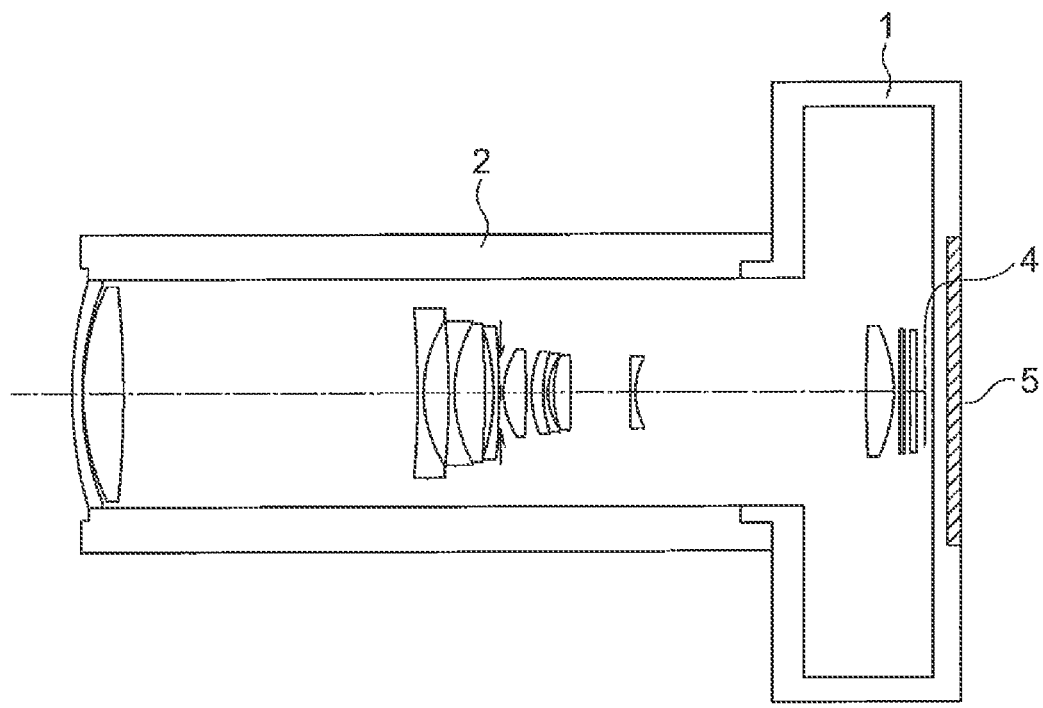
FIG. 17 is a cross sectional view of a compact camera as an image pickup apparatus using a zoom lens according to the present invention and using a small-size CCD or CMOS as an image pickup element.

FIG. 17 is a cross-sectional view of a compact camera 1 as an image pickup apparatus in which, the zoom lens according to the present invention is used, and a small-size CCD (charge coupled device) or a CMOS (complementary metal oxide semiconductor) is used. An image pickup lens system 2 is disposed inside a lens barrel of the compact camera 1, and an image pickup element surface 4, and a back monitor 5 are disposed inside a body.

Here, it is also possible to let the image pickup lens system 2 to be detachable from a single-lens mirrorless camera by providing a mounting portion to the lens barrel. As the mounting portion, for example, a screw type mount or a bayonet type mount could be used.

The zoom lens described in the embodiments from the first embodiment to the eighth embodiment is to be used as the image pickup lens system 2 of the compact camera 1 having such structure.

Figure 18:
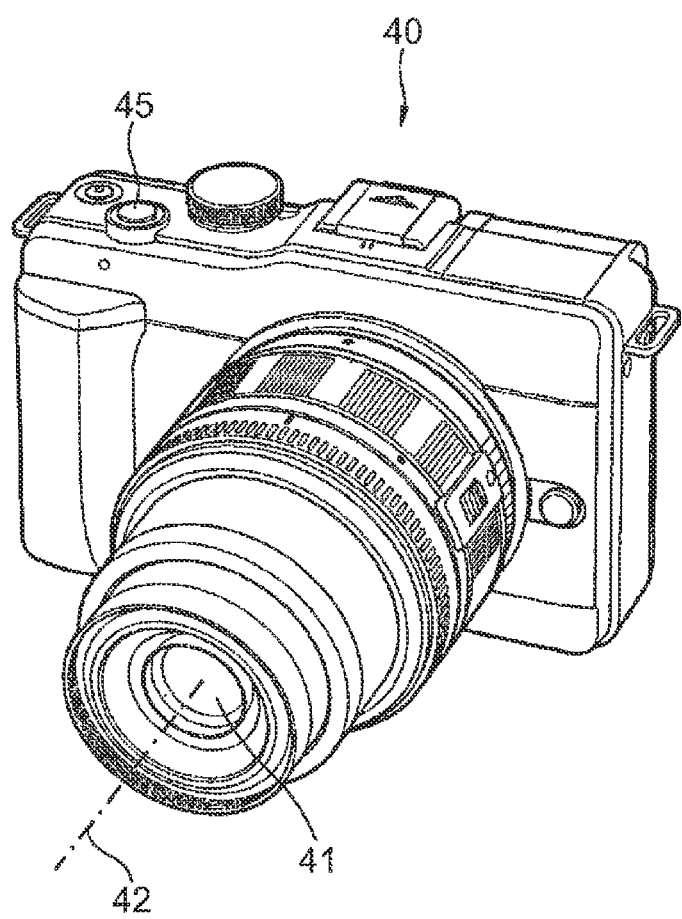
FIG. 18 is a front perspective view showing the outer appearance of a digital camera as an image pickup apparatus.
Figure 19:
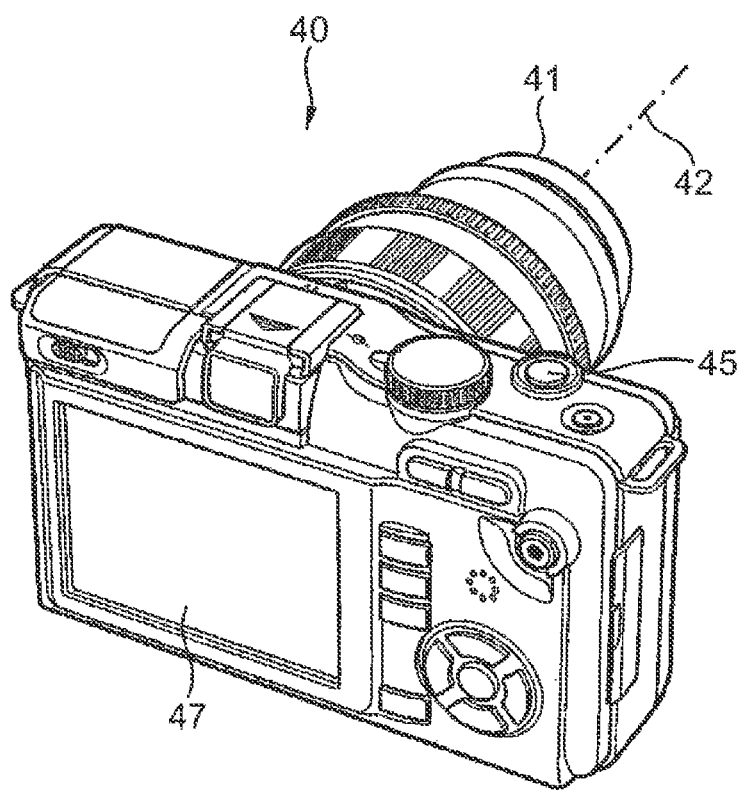
FIG. 19 is a rear perspective view of the digital camera as an image pickup apparatus.

FIGS. 18 and 19 show conceptual diagrams of a structure of the image pickup apparatus according to the present invention in which, the zoom lens has been incorporated in a photographic optical system 41. FIG. 18 is a front perspective view showing an appearance of a digital camera 40 as an image pickup apparatus, and FIG. 19 is a rear perspective view showing an appearance of the digital camera 40.

The digital camera 40 according to the embodiment includes the photographic optical system 41 positioned on a capturing optical path 42, a shutter button 45, and a liquid-crystal display monitor 47. When the shutter button 45 disposed on an upper portion of the digital camera 40 is pressed, in conjunction with the pressing of the shutter button 45, an image is captured through the photographic optical system 41 such as the zoom lens according to the first embodiment. An object image which has been formed by the photographic optical system 41 is formed on an image pickup element (photoelectric conversion surface) provided near an image forming surface. The object image which has been received by the image pickup element is displayed as an electronic image on the liquid-crystal display monitor 47 provided on a rear surface of the digital camera 40 by a processing unit. Moreover, it is possible to record the electronic image which has been captured in a recording unit.

(Internal Circuit Structure)

Figure 20:
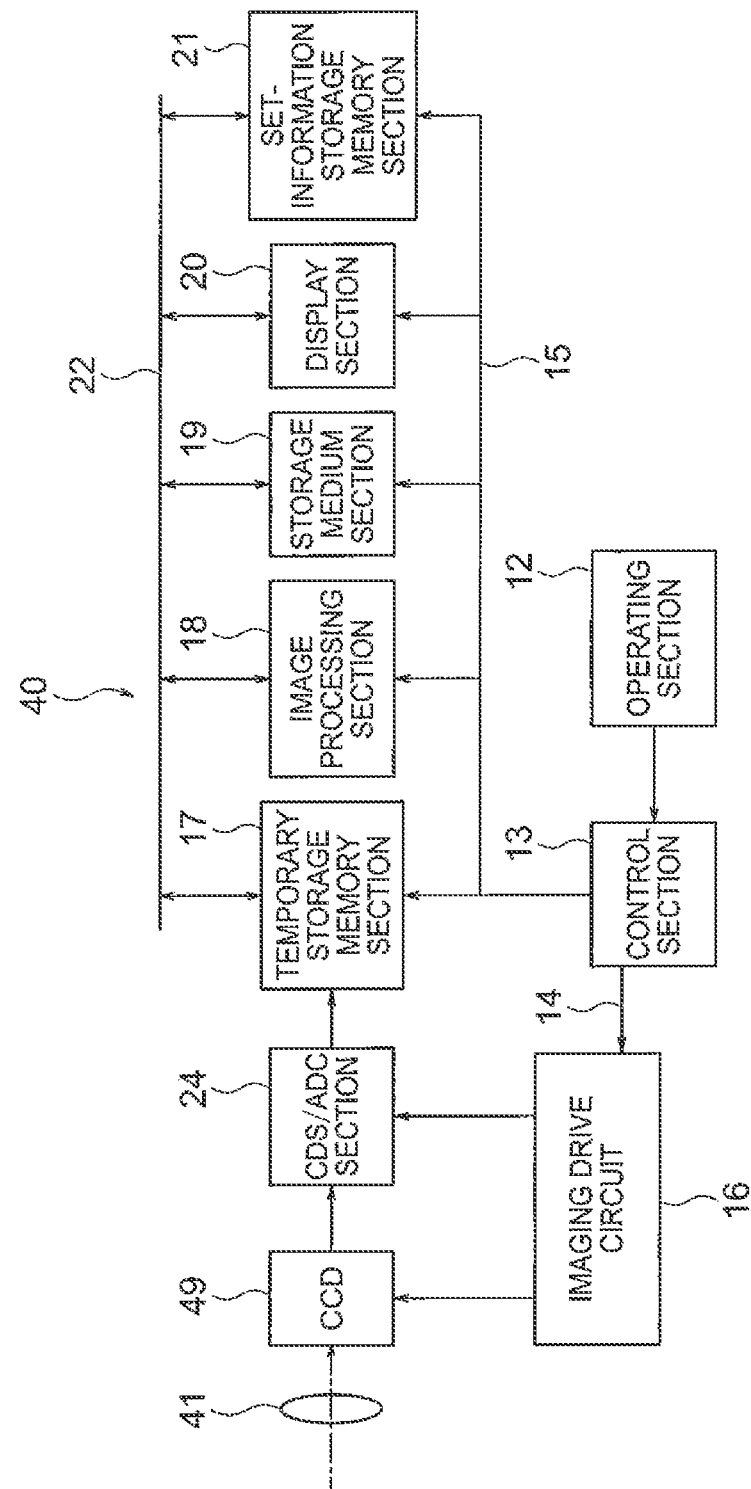
FIG. 20 is a block diagram showing the relevant internal circuit configuration of the digital camera.

FIG. 20 is a block diagram showing an internal circuit of main components of the digital camera 40. In the following description, the processing unit mentioned above includes components such as CDS/ADC section 24, a temporary storage memory section 17, and an image processing section 18. A storage unit includes a storage medium As shown in FIG. 20, the digital camera 40 includes an operating section 12, a control section 13 which is connected to the operating section 12, an imaging drive circuit 16 which is connected to a control-signal output port of the control section 13 via buses 14 and 15, the temporary storage memory section 17, the image processing section 18, a storage medium section 19, a display section 20, and a set-information storage memory section 21.

The temporary storage memory section 17, the image processing section 18, the storage medium section 19, the display section 20, and the set-information storage memory section 21 are capable of inputting and outputting data mutually via a bus 22. Moreover, a CCD 49 and the CDS/ADC section 24 are connected to the imaging drive circuit 16.

The operating section 12 includes various input buttons and switches, and imparts event information input from outside (user of camera) via the input buttons and switches to the control section 13. The control section 13 is a central arithmetic processing unit such as a CPU with a built-in program memory which is not shown in the diagram, and controls the overall digital camera according to a computer program which has been stored in the computer program memory.

The CCD 49 is an image pickup element which is driven and controlled by the imaging drive circuit 16, and which converts an amount of light for each pixel of the object image which has been formed through the image pickup optical system 41 to an electric signal, and outputs to the CDS/ADC section 24.

The CDS/ADC section 24 is a circuit which amplifies the electric signal input from the CCD 49, and also carries out analog-to-digital conversion, and outputs image raw-data only for the amplification and digital conversion carried out (bayer data, hereinafter called as 'RAW data').

The temporary storage memory section 17 is a buffer such as a SDRAM, and is a memory unit which temporarily stores the RAW data output put from the CDS/ADC section 24. The image processing section 18 is a circuit which reads the RAW data which has been stored in the temporary storage memory section 17 or the RAW data which has been stored in the storage medium section 19, and carries out electrically, various image processing including a distortion correction based on image-quality parameters which have been specified by the control section 13.

The recording medium section 19 in which, a recording medium in the form of a stick or a card with a flash memory is detachably mounted, records and maintains the RAW data which is transferred from the temporary storage memory section 17 and image data which has been subjected to image processing in the image processing section 18.

The display section 20 includes the liquid-crystal display monitor 47 and displays operation menu, image data, and RAW data captured. The set-information storage memory section 21 is provided with a ROM section in which various image-quality parameters are stored in advance, and a RAM section which stores the image-quality parameters which have been read from the ROM section by an input and output operation of the operating section 12.

The digital camera 40 which is structured in such manner, by adopting the zoom lens according to the present invention as the photographic optical system 41, enables zooming, and enables setting of a first mode which enables focusing including up to infinity and a second mode in which it is possible to achieve substantial (high) magnification, thereby making it possible to let to be an image pickup apparatus which is advantageous for both small-sizing and improved performance.

As described above, the zoom lens according to the present invention is useful when it is desired that the zoom lens be short in overall length while having a high zoom ratio and that variation in the weight balance with zooming be made small.

The zoom lens and the image pickup apparatus using the same according to the present invention is advantageous in that the zoom lens is short in overall length and that variation in the weight balance with zooming can easily be made small.

What is claimed is:

1. A zoom lens comprising, in order from an object side to an image side:
a first lens unit having a positive refractive power;
a second lens unit having a negative refractive power;
a third lens unit having a positive refractive power; and
a fourth lens unit having a negative refractive power, wherein
during zooming from a wide angle end to a telephoto end, a distance between the first lens unit and the second lens unit, a distance between the second lens unit and the third lens unit, and a distance between the third lens unit and the fourth lens unit vary,
in zooming from the wide angle end to the telephoto end, the first lens unit is located closer to the object side at the telephoto end than at the wide angle end,
the first lens unit consists of two lenses including a negative lens and a positive lens,
the first lens unit has at least one aspheric surface in an optical path, and
the zoom lens satisfies the following conditional expression (1):

$$0.5 < (L_{TLt}/\beta_{rear})/F_{LG1} < 1.0 \tag{1},$$

where $L_{TLt}$ is a distance on an optical axis from a refracting surface closest to the object side in an entire zoom lens system to an image plane at the telephoto end, $\beta_{rear}$ is the absolute value of a lateral magnification of a composite optical system from the second lens unit to the image plane at the telephoto end, and $F_{LG1}$ is the focal length of the first lens unit.

2. A zoom lens comprising, in order from an object side to an image side:
a first lens unit having a positive refractive power;
a second lens unit having a negative refractive power;
a third lens unit having a positive refractive power; and
a fourth lens unit having a negative refractive power, wherein
during zooming from a wide angle end to a telephoto end, a distance between the first lens unit and the second lens unit, a distance between the second lens unit and the third lens unit, and a distance between the third lens unit and the fourth lens unit vary,
in zooming from the wide angle end to the telephoto end, the first lens unit is located closer to the object side at the telephoto end than at the wide angle end,
the first lens unit consists of two lenses including a negative lens and a positive lens,
the first lens unit has at least one aspheric surface in an optical path, and
the zoom lens satisfies the following conditional expression (2):

$$0.3 < F_{LG1}/F_{Lt} < 0.57 \tag{2},$$

where $F_{LG1}$ is the focal length of the first lens unit, and $F_{Lt}$ is the focal length of an entire zoom lens system at the telephoto end.

3. The zoom lens according to claim 1, wherein the zoom lens comprises a fifth lens unit having a positive refractive power arranged on the image side of the fourth lens unit, and a distance between the fourth lens unit and the fifth lens unit varies during zooming from the wide angle end to the telephoto end.

4. The zoom lens according to claim 1, wherein the zoom lens satisfies the following conditional expression (2):

$$0.3 < F_{LG1}/F_{Lt} < 0.57 \tag{2},$$

where $F_{LG1}$ is the focal length of the first lens unit, and $F_{Lt}$ is the focal length of the entire zoom lens system at the telephoto end.

5. The zoom lens according to claim 1, wherein the zoom lens satisfies the following conditional expression (3):

$$0.004 < F_{LG1}/(F_{Lt} \times |\nu_{G1p} - \nu_{G1n}|) < 0.020 \tag{3},$$

where $F_{LG1}$ is the focal length of the first lens unit, $F_{Lt}$ is the focal length of the entire zoom lens system at the telephoto end, $\nu_{G1p}$ is the Abbe constant of the positive lens in the first lens unit, and $\nu_{G1n}$ is the Abbe constant of the negative lens in the first lens unit, $\nu_{G1p}$ being expressed by $\nu_{G1p} = (n_{dp}-1)/(n_{Fp}-n_{Cp})$, where $n_{dp}$ is the refractive index of the positive lens in the first lens unit with respect to the d-line, $n_{Cp}$ is the refractive index of the positive lens in the first lens unit with respect to the C-line, and $n_{Fp}$ is the refractive index of the positive lens in the first lens unit with respect to the F-line, and $v_{G1n}$ being expressed by $v_{G1n}=(n_{dn}-1)/(n_{Fn}-n_{Cn})$, where $n_{dn}$ is the refractive index of the negative lens in the first lens unit with respect to the d-line, $n_{Cn}$ is the refractive index of the negative lens in the first lens unit with respect to the C-line, and $n_{Fn}$ is the refractive index of the negative lens in the first lens unit with respect to the F-line.

6. The zoom lens according to claim 1, wherein the zoom lens satisfies the following conditional expression (4):

$$2<F_{LG1}/(F_{Lt}\times|P_{G1p}-P_{G1n}|)<10 \qquad (4),$$

where $F_{LG1}$ is the focal length of the first lens unit, $F_{Lt}$ is the focal length of the entire zoom lens system at the telephoto end, $P_{G1p}$ is a value expressed by $P_{G1p}=(n_{gp}-n_{Fp})/(n_{Fp}-n_{Cp})$, where $n_{gp}$ is the refractive index of the positive lens in the first lens unit with respect to the g-line, $n_{Fp}$ is the refractive index of the positive lens in the first lens unit with respect to the F-line, and $n_{Cp}$ is the refractive index of the positive lens in the first lens unit with respect to the C-line, and $P_{G1n}$ is a value expressed by $P_{G1n}=(n_{gn}-n_{Fn})/(n_{Fn}-n_{Cn})$, where $n_{gn}$ is the refractive index of the negative lens in the first lens unit with respect to the g-line, $n_{Fn}$ is the refractive index of the negative lens in the first lens unit with respect to the F-line, and $n_{Cn}$ is the refractive index of the negative lens in the first lens unit with respect to the C-line.

7. The zoom lens according to claim 1, wherein the zoom lens satisfies the following conditional expression (5):

$$0.05<(L_{TLt}-L_{TLw})/F_{Lt}<0.30 \qquad (5),$$

where $L_{TLw}$ is a distance on the optical axis from the refracting surface closest to the object side in the zoom lens to the image plane at the wide angle end, $L_{TLt}$ is a distance on the optical axis from the refracting surface closest to the object side in the zoom lens to the image plane at the telephoto end, and $F_{Lt}$ is the focal length of the entire zoom lens system at the telephoto end.

8. The zoom lens according to claim 1, wherein the first lens unit consists, in order from the object side to the image side, of the negative lens and the positive lens, and each of the negative lens and the positive lens in the first lens unit is a single lens.

9. The zoom lens according to claim 8, wherein a distance between the negative lens and the positive lens increases with increasing distance from the optical axis.

10. The zoom lens according to claim 1, wherein the positive lens in the first lens unit has an aspheric surface, and both the object side surface and the image side surface thereof are aspheric surfaces.

11. The zoom lens according to claim 1, wherein the fourth lens unit is located closer to the object side at the telephoto end than at the wide angle end.

12. The zoom lens according to claim 1, wherein the zoom lens comprises a fifth lens unit having a positive refractive power arranged on the image side of the fourth lens unit, during zooming from the wide angle end to the telephoto end the fifth lens unit first moves toward the image side, and the fifth lens unit is located closer to the image side at the telephoto end than at the wide angle end.

13. The zoom lens according to claim 12, wherein during zooming from the wide angle end to the telephoto end, the fifth lens unit moves only toward the image side.

14. The zoom lens according to claim 12, wherein during zooming from the wide angle end to the telephoto end, the first lens unit moves only toward the object side.

15. The zoom lens according to claim 1, wherein for focusing from a long distance to a short distance, the fourth lens unit moves toward the image side.

16. The zoom lens according to claim 15, wherein the fourth lens unit is a single lens.

17. The zoom lens according to claim 1, further comprising a fifth lens unit, wherein the second lens unit is located closer to the image side at the telephoto end than at the wide angle end, the third lens unit is located closer to the object side at the telephoto end than at the wide angle end, the fourth lens unit is located closer to the object side at the telephoto end than at the wide angle end so that the distance between the fourth lens unit and the third lens unit and the distance between the fourth lens unit and the fifth lens unit are larger at the telephoto end than at the wide angle end, and the fifth lens unit is located closer to the image side at the telephoto end than at the wide angle end.

18. The zoom lens according to claim 1, wherein the zoom lens satisfies the following conditional expression (6):

$$17<F_{Lt}/F_{Lw}<50 \qquad (6),$$

where $F_{Lt}$ is the focal length of the entire zoom lens system at the telephoto end, and $F_{Lw}$ is the focal length of the entire zoom lens system at the wide angle end.

19. An image pickup apparatus comprising:
a zoom lens according to claim 1; and
an image pickup element that converts an image formed by the zoom lens into an electrical signal.

20. An image pickup apparatus according to claim 19, further comprising a signal conversion unit to which the electrical signal is input to convert it into a signal representing an image in which distortion of the image formed on the image pickup element is corrected.

* * * * *